United States Patent
Takahashi

(10) Patent No.: US 6,839,810 B2
(45) Date of Patent: *Jan. 4, 2005

(54) CONSISTENCY CONTROL DEVICE MERGING UPDATED MEMORY BLOCKS

(75) Inventor: Masafumi Takahashi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 191 days.

This patent is subject to a terminal disclaimer.

(21) Appl. No.: 09/895,157

(22) Filed: Jul. 2, 2001

(65) Prior Publication Data

US 2001/0039604 A1 Nov. 8, 2001

Related U.S. Application Data

(62) Division of application No. 09/263,789, filed on Mar. 5, 1999, now Pat. No. 6,289,419.

(30) Foreign Application Priority Data

Mar. 6, 1998 (JP) .......................................... 10-055137

(51) Int. Cl.[7] .......................... G06F 12/00; G06F 13/00
(52) U.S. Cl. ......................... 711/141; 711/118; 711/143
(58) Field of Search ............................. 711/3, 118, 141, 711/143, 146, 154; 709/223; 710/129, 52, 130

(56) References Cited

U.S. PATENT DOCUMENTS

| | | | |
|---|---|---|---|
| 5,155,824 A | * 10/1992 | Edenfield et al. | ........... 711/143 |
| 5,265,232 A | 11/1993 | Gannon et al. | |
| 5,293,603 A | 3/1994 | MacWilliams et al. | |
| 5,627,993 A | * 5/1997 | Abato et al. | ................. 711/143 |
| 5,652,859 A | 7/1997 | Mulla et al. | |
| 5,802,577 A | 9/1998 | Bhat et al. | |
| 5,897,656 A | 4/1999 | Vogt et al. | |
| 5,956,522 A | 9/1999 | Bertone et al. | |
| 5,983,205 A | 11/1999 | Brams et al. | |
| 6,049,847 A | 4/2000 | Vogt et al. | |

FOREIGN PATENT DOCUMENTS

JP          561770          3/1993

OTHER PUBLICATIONS

Kourosh Gharachorloo et al., 1990 IEEE, pp. 15–26/.
Richard N. Zucker et al., 1994 IEEE, pp. 163–172.
"Software Cache Coherence for Large Scale Multiprocessors," Leonidas I. Kontohanassis et al., *IEEE*, pp. 286–295, 1995.

* cited by examiner

*Primary Examiner*—Tuan V Thai
(74) *Attorney, Agent, or Firm*—Birch, Stewart, Kolasch & Birch, LLP.

(57) ABSTRACT

A multiprocessor device includes a plurality of cache devices connected to a plurality of processors respectively, a consistency control unit connected to the plurality of cache devices, and a main memory. The cache device caches data accessed by a processor connected to the cache device, manages the cached data on the basis of a memory block. When the consistency control unit issues a write back request of a memory block, the cache device transmits the memory block to the consistency control unit. The consistency control unit merges data in the memory block supplied from the cache and the merged memory block is stored in the main memory.

13 Claims, 42 Drawing Sheets

| ADDRESS TAG | VALID FLAG | WRITE PRIVILEGE FLAG | LRU FIELD | DATA FIELD |
|---|---|---|---|---|

FIG.3

| MESSAGE NAME | TRANSMISSION | RECEPTION | MEANING |
|---|---|---|---|
| WRITE BACK COMMAND | PROCESSOR | CACHE | REQUEST FOR START OF WRITE BACK PROCESS |
| WRITE BACK RESPONSE | CACHE | PROCESSOR | RESPONSE TO WRITE BACK COMMAND COMPLETION OF WRITE BACK PROCESS |
| WRITE BACK START MESSAGE | CACHE | CONSISTENCY CONTROL UNIT | REQUEST FOR START OF MERGING PROCESS |
| WRITE BACK COMPLETION MESSAGE | CONSISTENCY CONTROL UNIT | CACHE | RESPONSE TO WRITE BACK START MESSAGE COMPLETION OF MERGING PROCESS |
| WRITE BACK REQUEST | CONSISTENCY CONTROL UNIT | CACHE | REQUEST FOR UPDATED DATA IN CACHE |
| WRITE BACK DATA | CACHE | CONSISTENCY CONTROL UNIT | RESPONSE TO WRITE BACK REQUEST DATA IN CACHE |
| READ REQUEST | CACHE | CONSISTENCY CONTROL UNIT | REQUEST FOR DATA IN MEMORY |
| READ DATA | CONSISTENCY CONTROL UNIT | CACHE | RESPONSE TO READ REQUEST DATA IN MEMORY |

FIG.4

| MESSAGE NAME | INFORMATION NAME | MEANING |
|---|---|---|
| WRITE BACK COMMAND | ADDRESS | ADDRESS SUBJECTED TO WRITE BACK PROCESS |
| WRITE BACK RESPONSE | NONE | |
| WRITE BACK START MESSAGE | IDENTIFIER ADDRESS | IDENTIFIER OF TRANSMITTER PROCESSOR ADDRESS SUBJECTED TO WRITE BACK PROCESS |
| WRITE BACK COMPLETION MESSAGE | NONE | |
| WRITE BACK REQUEST | ADDRESS | ADDRESS SUBJECTED TO WRITE BACK PROCESS |
| WRITE BACK DATA | UPDATE STATE DATA | INFORMATION ON UPDATED DATA WORD DATA IN DATA STORING UNIT |
| READ REQUEST | IDENTIFIER ADDRESS | IDENTIFIER OF TRANSMITTER PROCESSOR ADDRESS SUBJECTED TO READING PROCESS |
| READ DATA | DATA | DATA IN MEMORY |

*FIG.7*

| MANAGEMENT INFORMATION PORTION ||  STATE OF ENTRY |
|---|---|---|
| VALID BIT | MODIFIED BIT 0-3 | |
| 0 | INVALID | INVALID |
| 1 | 0000 | CLEAN |
| 1 | 1000 | DATA WORD 0 IS UPDATED |
| 1 | 0100 | DATA WORD 1 IS UPDATED |
| 1 | 1100 | DATA WORDS 0 AND 1 ARE UPDATED |
| 1 | ... | ... |
| 1 | 1010 | DATA WORDS 0 AND 2 ARE UPDATED |
| 1 | ... | ... |
| 1 | 1111 | ALL DATA WORDS ARE UPDATED |

FIG. 15

| MESSAGE NAME | TRANSMISSION | RECEPTION | MEANING |
|---|---|---|---|
| INVALIDATION REQUEST | CONSISTENCY CONTROL UNIT | CACHE | REQUEST INVALIDATION OF DATA IN CACHE |
| INVALIDATION RESPONSE | CACHE | CONSISTENCY CONTROL UNIT | RESPONSE TO INVALIDATION REQUEST |
| UPDATE DATA | CONSISTENCY CONTROL UNIT | CACHE | REQUEST FOR UPDATE OF DATA IN CACHE DATA IN MEMORY |
| UPDATE RESPONSE | CACHE | CONSISTENCY CONTROL UNIT | RESPONSE TO UPDATE DATA |

FIG.16

| MESSAGE NAME | INFORMATION NAME | MEANING |
|---|---|---|
| INVALIDATION REQUEST | ADDRESS | ADDRESS SUBJECTED TO INVALIDATION PROCESS |
| INVALIDATION RESPONSE | NONE | |
| UPDATE DATA | ADDRESS DATA | ADDRESS SUBJECTED TO UPDATE PROCESS DATA IN MEMORY |
| UPDATE RESPONSE | NONE | |

FIG.25

| MESSAGE NAME | INFORMATION NAME | MEANING |
|---|---|---|
| WRITE BACK COMMAND | ADDRESS | ADDRESS SUBJECTED TO WRITE BACK PROCESS |
| WRITE BACK RESPONSE | NONE | |
| WRITE BACK START MESSAGE | IDENTIFIER ADDRESS | IDENTIFIER OF TRANSMITTER PROCESSOR ADDRESS SUBJECTED TO WRITE BACK PROCESS |
| WRITE BACK COMPLETION MESSAGE | NONE | |
| WRITE BACK REQUEST | ADDRESS | ADDRESS SUBJECTED TO WRITE BACK PROCESS |
| WRITE BACK DATA | UPDATE STATE DATA | INFORMATION ON UPDATE OF CACHE ENTRY DATA IN DATA STORING UNIT |
| READ REQUEST | IDENTIFIER ADDRESS | IDENTIFIER OF TRANSMITTER PROCESSOR ADDRESS SUBJECTED TO READING PROCESS |
| READ DATA | DATA | DATA IN MEMORY |

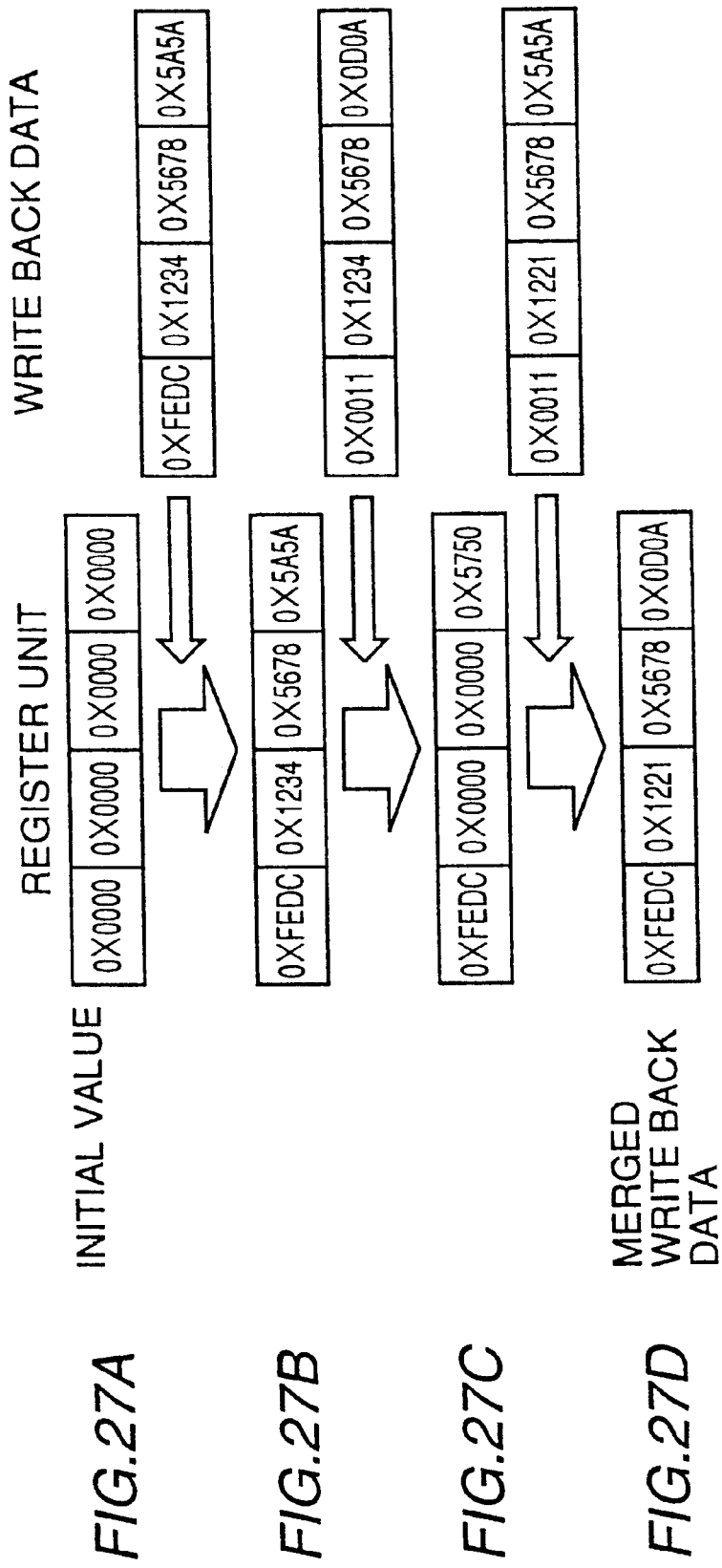

| STATE INDICATING PORTION | STATE OF CORRESPONDING CACHE |
|---|---|
| INVALID | CACHE HAS NO COPY OF MEMORY BLOCK |
| CLEAN | CACHE STORE NON-UPDATED COPY OF MEMORY BLOCK |
| UPDATED | CACHE STORE UPDATED COPY OF MEMORY BLOCK |

FIG.40

| TYPE OF MESSAGE | STATE INDICATING PORTION | |
|---|---|---|
| | VALUE BEFORE CHANGE | VALUE AFTER CHANGE |
| INVALIDATION REQUEST | INVALID, CLEAN | INVALID |
| UPDATE DATA | CLEAN | CLEAN |
| WRITE BACK REQUEST | INVALID CLEAN, UPDATED | INVALID CLEAN |
| READ REQUEST | INVALID | CLEAN |
| WRITE PRIVILEGE ACQUISITION MESSAGE | CLEAN | UPDATED |

FIG.41

| MESSAGE NAME | TRANSMISSION | RECEPTION | MEANING |
|---|---|---|---|
| WRITE PRIVILEGE ACQUISITION REQUEST | CACHE | CONSISTENCY CONTROL UNIT | CHANGE STATE INDICATING PORTION TO UPDATED |

FIG.42

| MESSAGE NAME | INFORMATION NAME | MEANING |
|---|---|---|
| WRITE PRIVILEGE ACQUISITION REQUEST | ADDRESS | ADDRESS SUBJECTED TO WRITE PRIVILEGE ACQUISITION PROCESS |

*FIG.43A*

| | DIRECTRY UNIT | | |
|---|---|---|---|
| | ADDRESS TAG | STATE INDICATING PORTION A | STATE INDICATING PORTION B |
| ① | 0×4000 | INVALID | CLEAN |
| | | INVALID | INVALID |
| ② | 0×1200 | UPDATED | UPDATED |
| ③ | 0×3300 | UPDATED | CLEAN |
| ④ | 0×1000 | UPDATED | INVALID |
| | | INVALID | INVALID |
| ⑤ | 0×5200 | INVALID | UPDATED |
| | | INVALID | INVALID |

*FIG.43B*

| | CACHE A |
|---|---|
| ④' | 0×1000 |
| ②' | 0×1200 |
| | INVALID CACHE ENTRY |
| ③' | 0×3300 |

| | CACHE B |
|---|---|
| ①" | 0×4000 |
| ②" | 0×1200 |
| ⑤" | 0×5200 |
| ③" | 0×3300 |

*FIG.44*

| STATE INDICATING PORTION | TRANSMITTED MESSAGE |
|---|---|
| INVALID | NO TRANSMISSION OF MESSAGE |
| CLEAN | INVALIDATION REQUEST OR UPDATE DATA |
| UPDATED | AFTER WRITE BACK REQUEST, INVALIDATION REQUEST OR UPDATE DATA |

FIG.47

|  |  | INVALIDATION REQUEST /UPDATE REQUEST | |
|---|---|---|---|
|  |  | NOT TRANSMIT | TRANSMIT |
| PERFECT DIRECTRY | | FIG.45 | FIG.46 |
| PARTIAL DIRECTRY | THERE IS CORRESPONDING DIRECTRY ENTRY | FIG.45 | FIG.46 |
|  | THERE IS NO CORRESPONDING DIRECTRY ENTRY | FIG.11 | FIG.20 |

CONSISTENCY CONTROL DEVICE MERGING UPDATED MEMORY BLOCKS

This application is a divisional of application Ser. No. 09/263,789, filed on Mar. 5, 1999 now U.S. Pat. No. 6,289,419, the entire contents of which are hereby incorporated by reference.

BACKGROUND OF THE INVENTION

1. Field of the Invention

The present invention relates to multiprocessor devices which process information while communicating information between processors via a main memory, and particularly to a multiprocessor device as well as a cache device, a consistency control device and a protocol conversion device used in the multiprocessor device adopting a weak memory consistency model.

2. Description of the Background Art

A request for improvement in the processor performance is recently increasing in various fields such as multimedia processing and high-resolution image processing. The currently available LSI (Large Scale Integration) manufacturing technique, however, has a limit to enhancement of the device speed. A multiprocessor device according to the distributed processing system is now attracting attention and being actively studied and developed.

A processor device having a single processor is often provided with a cache for storing data which is more likely to be referenced by the processor in order to respond speedily to the memory access by the processor. For example, a microprocessor employs a merged cache having a capacity of 8 K bytes to achieve improvement of the system performance. In such a microprocessor, the memory address space is divided into sections each having 16 bytes, and the 16-byte section is associated with a cache entry and individually managed by the cache. The divided memory section having a prescribed byte of 16 bytes, for example, is hereinafter referred to as a memory block. In a processor device employing a write-back cache, an update process by a store instruction of the processor is completed only by updating a copy of a memory block in the cache. The updated copy of the memory block within the cache is written back to a main memory by an instruction from the processor or a replacement process caused by a command capacity of the cache. Compared with a processor device employing a write-through cache which directly updates a main memory each time a store instruction from the processor is executed, the performance is generally improved. However, data in a memory block of the main memory has its content different from an updated copy of a corresponding memory block in the cache.

A multiprocessor device employing a plurality of processors also employs the cache. In such a multiprocessor device, two types of caches, that is, a cache belonging to each processor and a cache shared by the plurality of processors are employed. The cache specific to each processor and the cache shared by the plurality of processors are respectively referred to simply as a cache and as an auxiliary cache in the following description. The cache in the multiprocessor device makes a high speed response to the memory access, and further functions to reduce the traffic on an interconnection network that interconnects the processors and a main memory.

When the cache is employed, copies of the same memory block are present in a plurality of caches. Update of data in the cache by the processor causes inconsistency between data in the main memory and the copy in the cache, leading to a problem of so-called cache consistency. For a correct operation of the multiprocessor device, update of data in a cache by one processor should be correctly reflected on reference of the data by another processor. The state in which update of data by one processor is accurately reflected on reference by another processor is herein considered as a state in which the memory consistency is maintained. In addition, a model which defines a result obtained by a series of memory accesses by a plurality of processors and on which a program is described to maintain the memory consistency is herein referred as a memory consistency model.

There are a number of conventional methods for guaranteeing the memory consistency. According to one type of classification of the methods for guaranteeing the memory consistency, there are two methods, a method by invalidation and a method by update. According to the method by invalidation, when a copy of a memory block in a cache is updated by any processor, copies of other caches are discarded. After that, if a processor attempts to refer to an invalidated memory block from the cache, the cache having the updated copy provides the updated copy directly or via the main memory or the auxiliary cache to the processor. According to the method by update, if a copy of a memory block in any cache is updated, copies of memory blocks in other caches are also updated. Both methods allow the processor to refer to the content of a latest memory block by reading the memory block from the cache.

According to another type of classification, one method is based on snooping mechanism and the other method is based on directory mechanism. The snooping mechanism is widely used in a bus-connected multiprocessor device. In the snooping mechanism, when a cache makes a request for updating of a memory block or reading of a memory block from the main memory, the request is broadcasted via a bus. Other caches monitor the request and perform write back, invalidation or update of a copy of the memory block as necessary. In the directory mechanism, information about which cache has a copy of each memory block is managed and the copy is written back, invalidated, or updated as necessary.

FIG. 1 illustrates a structure of an entry provided to a cache in a multiprocessor device disclosed in Japanese Patent Laying-Open No. 5-61770. A write privilege flag in this entry is used for management of an exclusive write privilege (right to write), and control is made for each memory block such that more than one cache entries in which the write privilege flag is set are not present in the multiprocessor device. The processor cannot update a copy of a memory block unless the write privilege flag is set in a cache entry within the cache. In this multiprocessor device, before the processor updates a copy of a memory block in the cache, an exclusive write privilege to the memory block is obtained and a copy of the corresponding memory block stored in other caches having no exclusive write privilege to that memory block is invalidated. As a result, it is guaranteed that the updated copy of the memory block is present in only one cache having the exclusive write privilege to ensure the memory consistency.

The size of the data to which the processor makes access is smaller than the size of the memory block in most cases. Therefore, the state of false sharing in which different processors make access to different data in the same memory block occurs. In the case of the multiprocessor device described above, if the false sharing occurs, a process for guaranteeing the consistency is performed for each memory block even if different data are accessed.

"Memory Consistency and Event Ordering in Scalable Shared-Memory Multiprocessors" (pp. 15–26, 17th Annual International Symposium on Computer Architecture) pays attention to the flow of a program to show that a strong memory consistency model is not necessarily required for guaranteeing the memory consistency for each memory access by a processor, and proposes a multiprocessor device employing a weak memory consistency model. However, the conventional multiprocessor device described above employs a strong memory consistency model for guaranteeing the memory consistency for each memory access.

If the false sharing occurs in the conventional multiprocessor device above, the exclusive write privilege to a memory block containing data to be updated is migrated to cause invalidation of data irrelevant to the data to be updated due to the migration of the write privilege. The unnecessary invalidation of data increases an average access time of the memory. The conventional multiprocessor device thus has a problem of decrease in process performance due to the false sharing.

The multiprocessor device maintaining the consistency by updating a copy of a memory block which is stored in other caches also has a problem of decrease in process performance due to a number of messages for updating a memory block in each cache upon occurrence of the false sharing. These problems arise in both of the multiprocessor devices respectively employing the snooping mechanism and the directory mechanism when the exclusive write privilege to the memory block is utilized for guaranteeing the memory consistency.

In addition, in the multiprocessor device described above, the program is made on the basis of the weak memory consistency model. Therefore, a process for guaranteeing the consistency is executed for each memory access even if absence of the consistency causes no problem. As a result, excessive messages are generated to decrease the process performance similarly to the case of the false sharing.

SUMMARY OF THE INVENTION

One object of the present invention is to provide a cache device capable of constituting a multiprocessor device permitting presence of a plurality of write privileges to the same memory block based on a weak memory consistency model.

Another object of the present invention is to provide a consistency control device capable of constituting a multiprocessor device permitting presence of a plurality of write privileges to the same memory block based on a weak memory consistency model.

Still another object of the invention is to provide a protocol conversion device capable of constituting a multiprocessor device permitting presence of a plurality of write privileges to the same memory block based on a weak memory consistency model.

Still another object of the invention is to provide a multiprocessor device permitting presence of a plurality of write privileges to the same memory block based on a weak memory consistency model.

According to one aspect of the invention, a cache device includes a cache memory caching data accessed by a processor, a cache management unit managing the cache memory on the basis of a memory block, holding, when a data word is updated by the processor, identification information regarding which data word in a memory block is updated, and attaching the identification information to the memory block and transmitting the memory block having the identification information attached thereto when a write back request of the memory block is externally made, and a communication unit for receiving a write back command from the processor and transmitting a write back start message to any external unit.

The cache management unit transmits the memory block having the identification information attached thereto, so that the memory block can be merged upon reception by any external unit. The communication unit receives the write back command from the processor and transmits the write back start message to any external unit, so that the external unit can easily recognize the start of the write back process of the memory block.

According to another aspect of the invention, a consistency control device includes a data merging unit for merging data of an externally supplied memory block based on the memory block and identification information concerning which data word in the memory block is updated and a storing unit for storing in a main memory the memory block merged by the data merging unit.

The data merging unit merges data of the memory block based on the memory block and the identification information, so that each processor can update the contents of different data of the same memory block in the cache.

According to still another aspect of the invention, a consistency control device includes a data merging unit for merging data in an externally supplied memory block, and a storing unit for storing a main memory the memory block merged by the data merging unit.

The data merging unit merges data in the received memory block, so that each processor can update the contents of different data of the same memory block in the cache.

According to still another aspect of the invention, a protocol conversion device includes a transaction processing unit processing transaction on a snooping bus, an interconnection network interface communicating message via an interconnection network, and a protocol conversion control unit converting the transaction processed by the transaction processing unit to the message communicated by the interconnection network interface and vice versa.

The protocol conversion control unit converts the transaction to the message and vice versa, so that the existing processor unit can be employed in a multiprocessor device.

According to still another aspect of the invention, a multiprocessor device includes a plurality of processors, a plurality of cache devices respectively connected to the plurality of processors, and a consistency control device connected to the plurality of cache devices and a main memory. The plurality of cache devices each include a cache memory caching data accessed by a processor connected thereto, and a cache management unit managing the cache memory on the basis of a memory block, holding, when a data word is updated by the processor connected thereto, identification information concerning which data word in the memory block is updated, and attaching the identification information to the memory block and transmitting the memory block with the identification information to the consistency control device when a write back request of the memory block is made. The consistency control device includes a data merging unit merging data of the memory block based on the memory block and the identification information supplied from the cache management unit, and a store unit storing the memory block merged by the data merging unit in the main memory.

The consistency control device merges data of the memory block based on the memory block and the identification information supplied from the cache management unit, so that each cache device can individually update different data of the same memory block.

According to still another aspect of the invention, a multiprocessor device includes a plurality of processors, a plurality of cache devices connected to the plurality of processors respectively, a consistency control device connected to the plurality of cache devices via an interconnection network, and a main memory connected to the consistency control device. The plurality of cache devices each include a cache memory caching data accessed by the processor connected thereto, and a cache management unit managing the cache memory on the basis of a memory block, and transmitting, when a write back request of a memory block is made, the memory block to the consistency control device. The consistency control device includes a data merging unit merging data in the memory block supplied from the cache management unit, and a store unit storing the memory block merged by the data merging unit in the main memory.

The consistency control device merges data in the memory block supplied from the cache management unit, so that each cache device can update different data in the same memory block.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 illustrates contents of a message used by the multiprocessor device according to the first embodiment of the invention.

FIG. 4 illustrates information attached to the message used by the multiprocessor device according to the first embodiment of the invention.

FIG. 7 illustrates the state of the cache entry.

FIG. 15 illustrates contents of a message added in a multiprocessor device according to the second embodiment of the invention.

FIG. 16 illustrates information attached to the added message in the multiprocessor device according to the second embodiment of the invention.

FIG. 25 illustrates information attached to messages according to the third embodiment of the invention.

FIGS. 27A–27D illustrate an operation of the write back data merging unit 504" (Example 1).

FIG. 40 illustrates a relation between a message received by the directory unit 8 and values respectively before change and after change of the state indication unit.

FIG. 41 illustrates the content of a write privilege acquisition request.

FIG. 42 illustrates information attached to the write privilege acquisition request.

FIG. 43A and 43B illustrate a relation between a directory entry in the directory unit and a cache.

FIG. 44 illustrates a relation between the content of the state indication unit and a message to be transmitted.

FIG. 47 illustrates a processing procedure determined by a relation between a full directory or a partial directory and a consistency control unit not transmitting an invalidation request/update request or a consistency control unit transmitting the invalidation request/update request.

DESCRIPTION OF THE PREFERRED EMBODIMENTS

The following description of the preferred embodiments of the present invention will be presented for the purpose of illustration. It is not intended to limit the invention to those embodiments.

(First Embodiment)

Figures 1, 2:
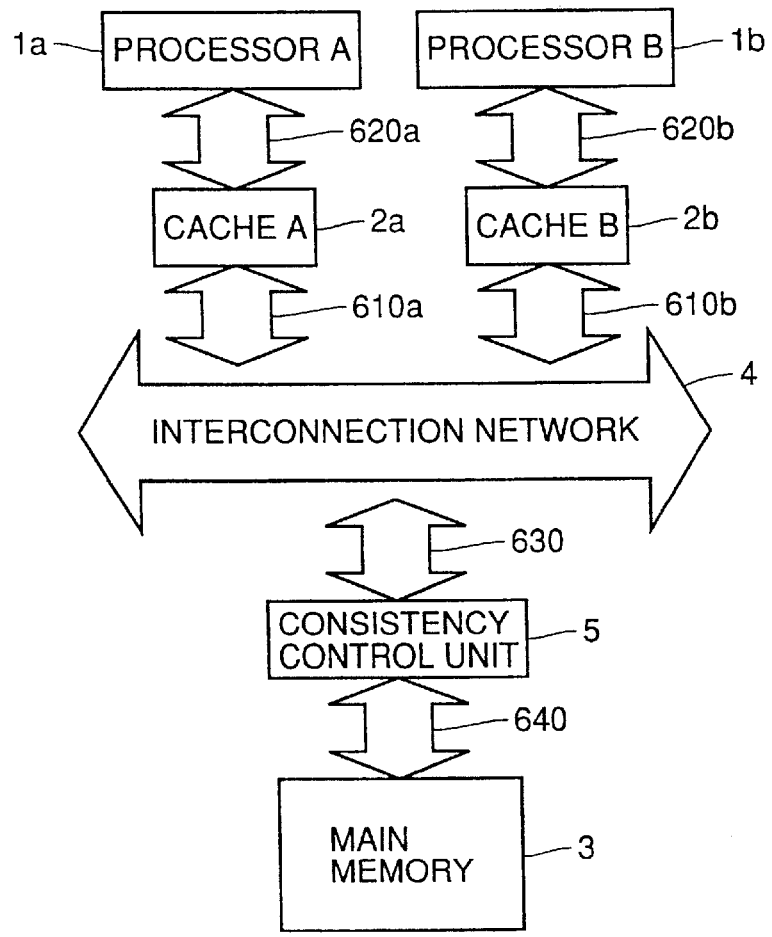
FIG. 1 illustrates a conventional cache entry.
FIG. 2 is a schematic block diagram illustrating a structure of a multiprocessor device according to the first embodiment of the invention.

FIG. 2 is a schematic block diagram illustrating a structure of a multiprocessor device according to the first embodiment of the present invention. The multiprocessor device includes processors 1a and 1b, caches 2a and 2b for caching data accessed by processor 1a or processor 1b, a consistency control unit 5 connected to caches 2a and 2b via an interconnection network 4 for controlling maintenance of a memory consistency, and a main memory 3. Caches 2a and 2b are each formed of a write-back cache.

FIG. 3 illustrates various messages used in the multiprocessor device according to this embodiment shown in FIG. 2. FIG. 4 illustrates information attached to the messages shown in FIG. 3. "Write back command" is a message transmitted from processor 1a or processor 1b to cache 2a or cache 2b for instructing start of a write back processing. Address information of a memory block to be subjected to the write back processing is attached to "write back command."

"Write back response" is a message transmitted from cache 2a or 2b to processor 1a or 1b in response to "write back command." This message is transmitted when the write back processing is completed.

"Write back start message" is a message transmitted from cache 2a or 2b to consistency control unit 5 for requesting start of an merging processing of write back data to consistency control unit 5 when cache 2a or 2b receives "write back command." An identifier of a processor which has transmitted "write back command" and address information of a memory block to be subjected to the write back processing are attached to "write back start message."

"Write back completion message" is a message transmitted in response to "write back start message" from consistency control unit 5 to cache 2a or 2b, the message transmitted to cache 2a or 2b when the merging processing for the write back data is completed.

"Write back request" is a message transmitted from consistency control unit 5 to cache 2a or 2b for requesting transmission of a memory block updated in cache 2a or 2b. Address information of the memory block subjected to the write back processing is attached to "write back request."

"Write back data" is a message transmitted in response to "write back request" from cache 2a or cache 2b to consistency control unit 5. The updated memory block in cache 2a or 2b and information concerning which data word in the memory block is updated (update state) are attached to "write back data."

"Read request" is a message transmitted from cache 2a or 2b to consistency control unit 5 for requesting reading of a memory block from main memory 3. An identifier of processor 1a or 1b which has requested reading and address information of a memory block subjected to a reading process are attached to "read request."

"Read data" is a message sent from consistency control unit 5 to cache 2a or 2b in response to "read request." Data of the memory block read from main memory 3 is attached to "read data."

Cache 2a or 2b dispatches "write back start message" to consistency control unit 5 when it receives "write back command" from processor 1a or 1b or when replacement of data is involved because of insufficiency in the cache capacity. Cache 2a or cache 2b transmits "write back start message" to consistency control unit 5 even if it does not hold the specified memory block when it receives "write back command" from processor 1a or 1b.

Cache 2a or 2b transmits, when it receives "write back request" from consistency control unit 5, "write back data" to consistency control unit 5 if the cache holds a copy of an updated memory block by itself. If cache 2a or 2b does not hold a copy of a memory block by itself, or holds the one which is not updated, cache 2a or 2b transmits "write back data" having an attached update status indicating that no word is updated (hereinafter referred to as clean "write back data") to consistency control unit 5. In the subsequent processing, since data in the message is not used, an arbitrary value (e.g. "0") can be set. Although data in the clean "write back data" message is not used, transmission of the message from the cache is necessary in order to enable consistency control unit 5 to detect all caches' responses to "write back request."

Although the method for transmitting messages may include message passing or circuit switching, the multiprocessor device of this embodiment does not depend on the method of transmitting messages. In addition, although the form of the interconnection network may include bus, multistage switch or the like, the multiprocessor device of this embodiment does not depend on the form of the interconnection network. However, if the interconnection network has a broadcast function, broadcasting of the "write back start message" may be used instead of the "write back request". In this case, the consistency control unit is not required to issue the "write back request".

Figure 5:
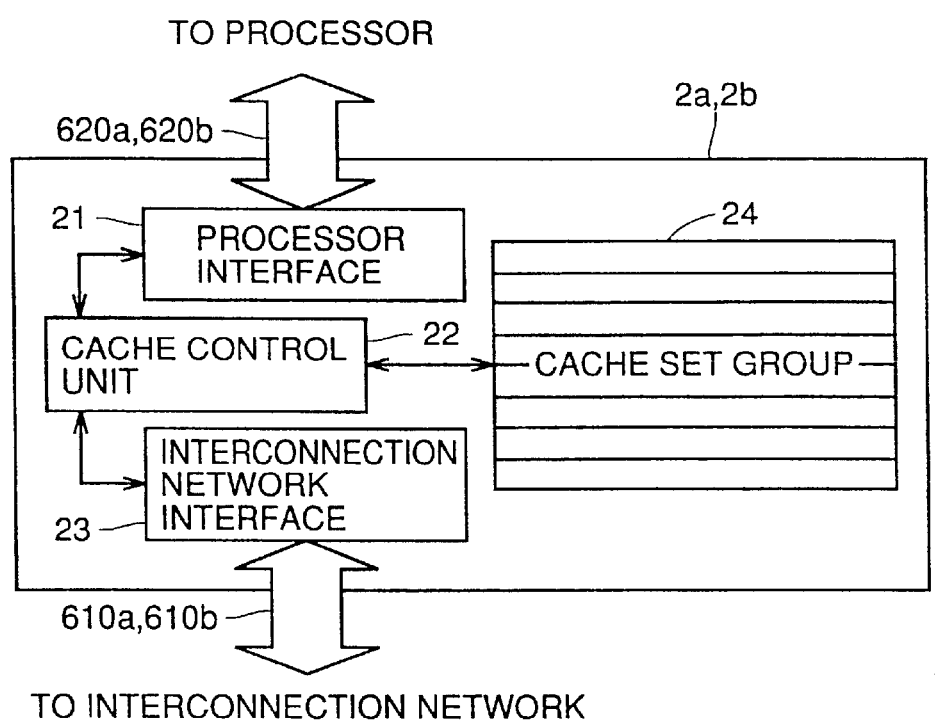
FIG. 5 is a schematic block diagram illustrating a structure of a cache according to the first embodiment of the invention.

FIG. 5 is a schematic block diagram illustrating a structure of cache 2a or 2b of the multiprocessor device according to this embodiment. Cache 2a or 2b includes a processor interface 21 connected to a processor bus 620a or 620b, a cache control unit 22 for the entire control of cache 2a or 2b, an interconnection network interface 23 connected to interconnection network 4 via a cache bus 610a or 610b, and a cache set group (cache memory) 24.

Cache 2a or 2b is basically controlled according to the write back system. The write back system is a known art and a detailed description thereof is not made here. It is noted that cache control unit 22 further has a function for transmitting/receiving messages as described above in conjunction with FIG. 3 and FIG. 4 and a function for controlling a cache entry described below.

Figure 6:
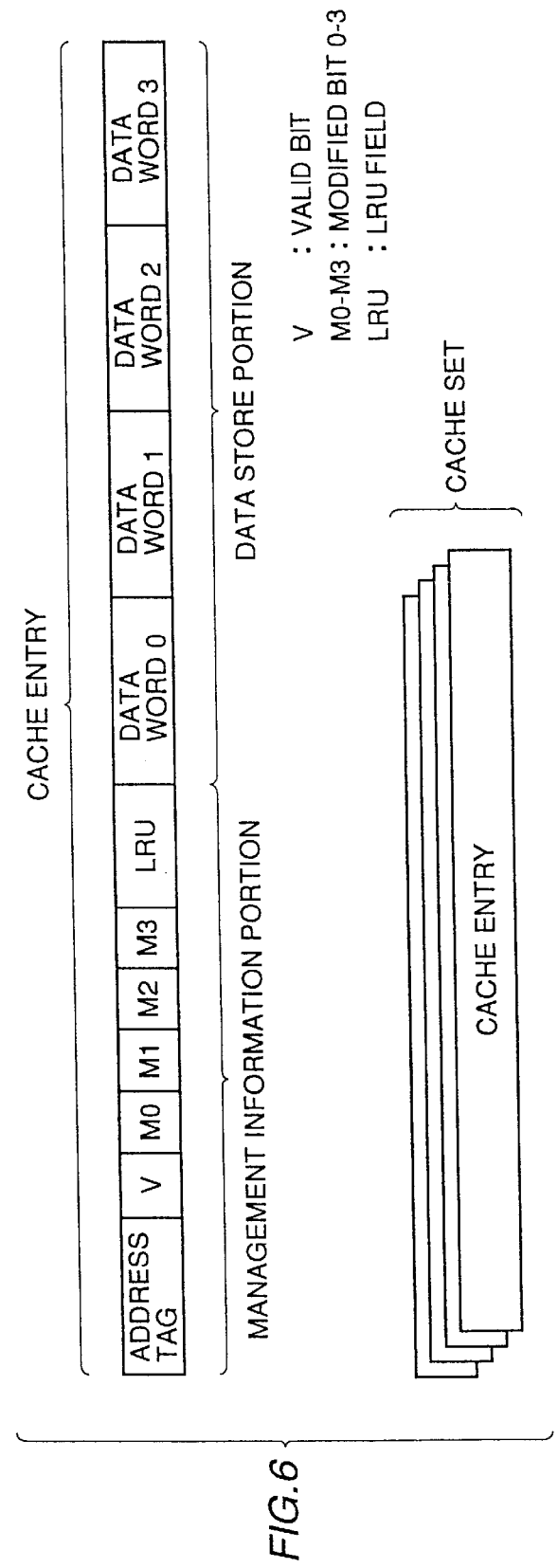
FIG. 6 illustrates contents of a cache entry.

FIG. 6 illustrates a cache entry in cache 2a or 2b of the multiprocessor device according to this embodiment. The cache entry includes an address tag of a memory block, a valid bit (V), modified bits M0–M3, an LRU (Least Recently Used) field, and data words 0–3. The LRU field is the information used for replacement of data. It is a known art and detailed description thereof is not made here. The cache entries corresponding to the associated memory locations are grouped to form a cache set group.

FIG. 7 illustrates the state of the entry represented by the valid bit (V) and modified bits M0–M3 in the cache entry shown in FIG. 6. When the valid bit V is "0," modified bits M0–M3 are invalid to represent that the entry is invalid. When the valid bit V is "1," the entry is valid. When the entry is valid, if modified bits M0–M3 each have a value of "0," the contents of data words corresponding to the modified bits are not updated, and if the value is "1," the corresponding data word is updated. Accordingly, when the valid bit V is "1," if all of the modified bits M0–M3 are "0," the corresponding cache entry is in the clean state. The number and the size of words in one memory block are defined by the demand for the system and those are not limited to the number and size shown in this drawing.

Figure 8:
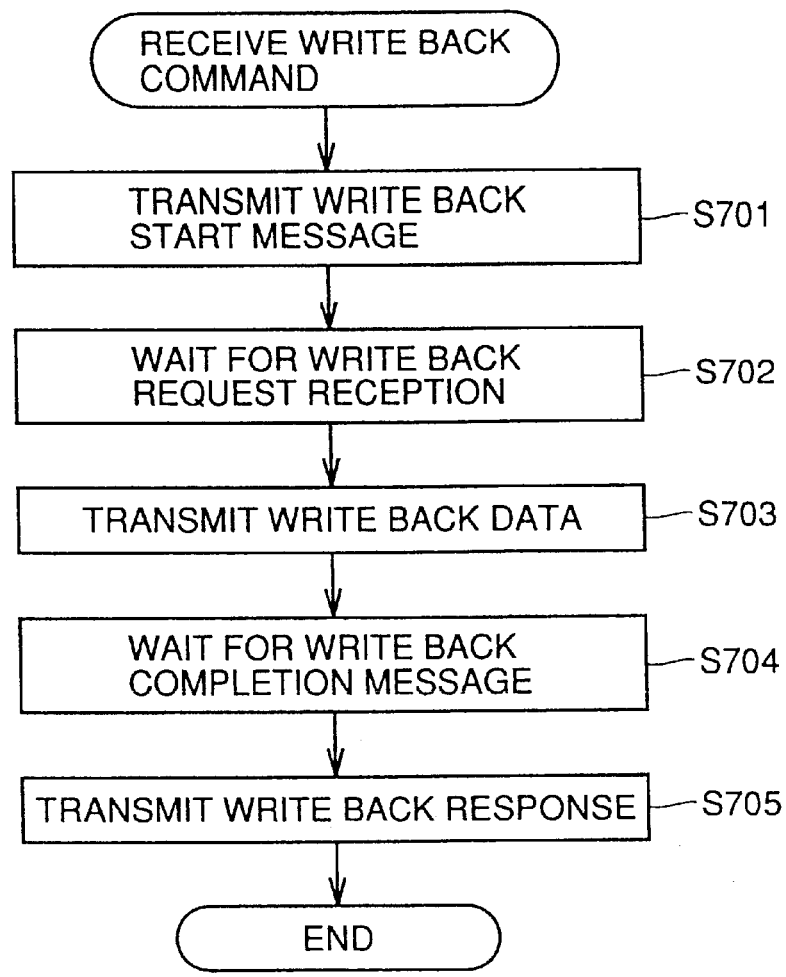
FIG. 8 is a flow chart illustrating a processing procedure of a cache which has received a write back command.

FIG. 8 is a flow chart illustrating a processing procedure followed when the cache receives "write back command" from the processor. When cache 2a or 2b receives "write back command," it transmits "write back start message" to consistency control unit 5(S701). Cache 2a or 2b waits for transmission of "write back request" from consistency control unit 5 (S702), and transmits "write back data" to consistency control unit 5 when it receives "write back request." Cache 2a or 2b waits for transmission of "write back completion message" from consistency control unit 5 (S704), and transmits "write back response" to processor 1a or 1b which has transmitted "write back command," when the cache receives "write back completion message" (S705). The processing is thus completed. If a replacement processing is done when the capacity of the cache is insufficient, the processing is the same except for the condition for start of the processing and except that "write back response" is not transmitted.

Figure 9:
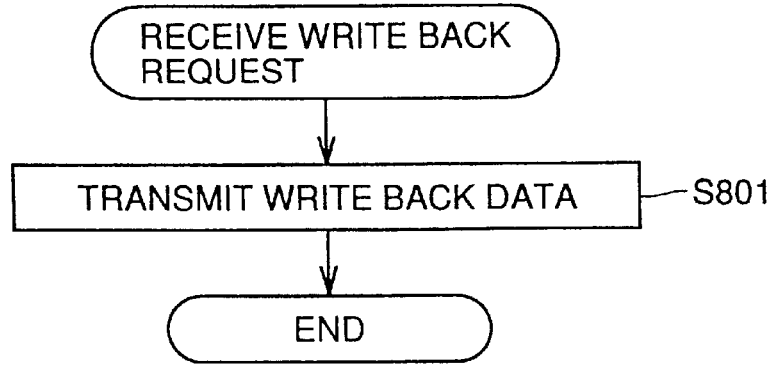
FIG. 9 is a flow chart illustrating a processing procedure followed when a cache receiving no write back command receives a write back request.

FIG. 9 is a flow chart illustrating a processing procedure followed when the cache receiving no "write back command" receives "write back request" from consistency control unit 5. When cache 2a or 2b receives "write back request" from consistency control unit 5, it transmits "write back data" to consistency control unit 5 (S801).

When cache 2a or 2b is in the step S702 of FIG. 8 in which it is waiting for "write back request," if it receives "write back request" concerning a memory block of another address, the processing shown in FIG. 8 is suspended and a process for transmitting a memory block of the another address is taken as shown in FIG. 9.

Figure 10:
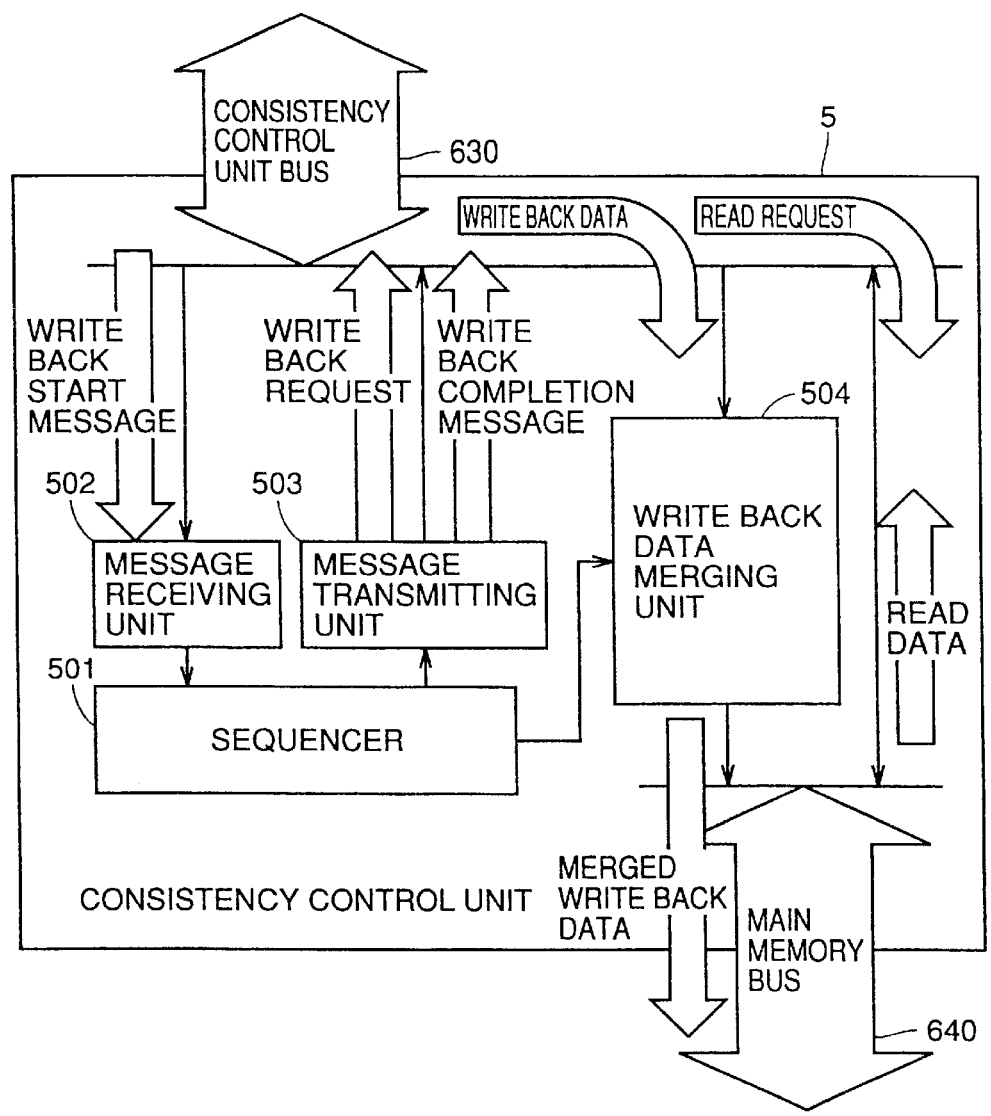
FIG. 10 is a schematic block diagram illustrating a structure of a consistency control unit 5 according to the first embodiment of the invention.

FIG. 10 is a schematic block diagram illustrating a structure of consistency control unit 5 of the multiprocessor device according to this embodiment. Consistency control unit 5 includes a sequencer 501 for the entire control of consistency control unit 5, a message receiving unit 502 for receiving a message from caches 2a and 2b, a message transmitting unit 503 for transmitting a message to caches 2a and 2b, and a write back data merging unit 504 for merging write back data supplied from caches 2a and 2b and storing the merged data in main memory 3.

When message receiving unit 502 receives "write back start message" from cache 2a or 2b, it starts sequencer 501. When a write back processing for another memory block by the sequencer has been in progress, if message receiving unit 502 receives "write back start message," start of sequencer 501 is suspended until sequencer 501 completes the ongoing write back processing. After completion of the ongoing write back processing by sequencer 501, message receiving unit 502 starts sequencer 501.

Figure 11:
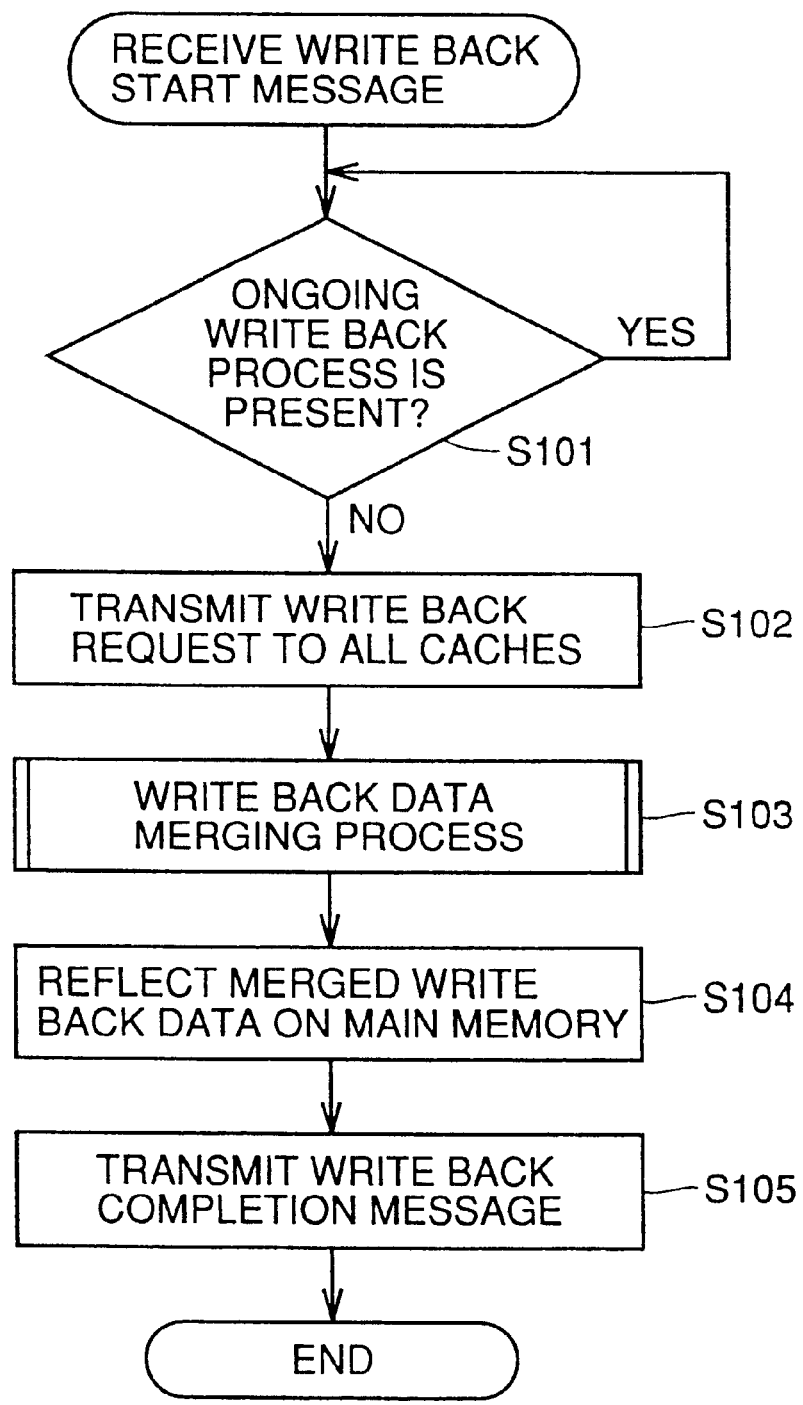
FIG. 11 is a flow chart illustrating a processing procedure of the consistency control unit 5.

FIG. 11 is a flow chart illustrating a processing procedure of consistency control unit 5 of the multiprocessor device according to the first embodiment. When message receiving unit 502 receives "write back start message" from cache 2a or 2b, it is determined whether any write back processing for another memory block is now in progress or not (S101). If there is any ongoing write back processing (S101, Yes), the processing is suspended until the ongoing write back processing is completed. If there is no ongoing write back processing (S101, No), message receiving unit 502 starts sequencer 501.

Following the instruction from sequencer 501, message transmitting unit 503 transmits "write back request" to all caches 2a and 2b (S102), and waits for transmission of "write back data" from caches 2a and 2b.

When write back data merging unit 504 is started by sequencer 501, write back data merging unit 504 executes an merging processing for "write back data" transmitted from caches 2a and 2b (S103). This write back data merging processing will be described below.

Write back data merging unit 504 stores the merged write back data in main memory 3 via a main memory bus 640 (S104). Sequencer 501 then starts message transmitting unit 503 to permit message transmitting unit 503 to transmit "write back completion message" to cache 2a or 2b which has transmitted "write back start message" (S105), and this processing is completed.

Figure 12:
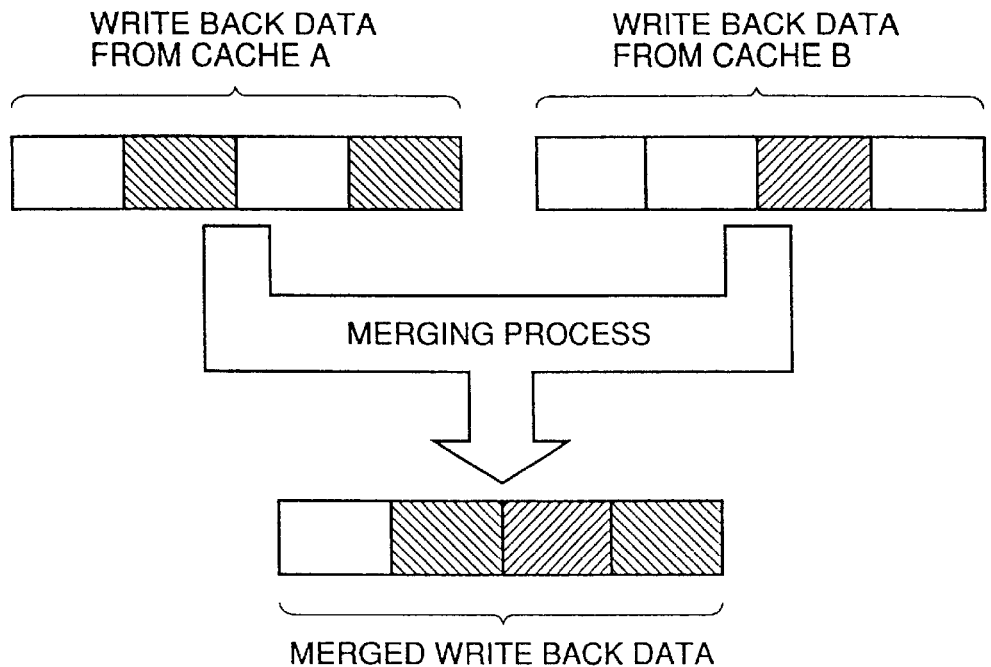
FIG. 12 illustrates processing for merging write back data.

FIG. 12 illustrates a process in step S103 of FIG. 11. Write back data merging unit 504 performs a merging process for write back data based on the contents of modified bits M0–M3 and the contents of data words 0–3 shown in FIG. 6, after removing clean "write back data" from supplied "write back data" group. For example, by reference to modified bits M0–M3 of "write back data" transmitted from cache 2a, it can be seen that data words 1 and 3 are updated. By reference to modified bits M0–M3 of "write back data" from cache 2b, it can be seen that only the data word 2 is updated. Write back data merging unit 504 accordingly extracts data word 1 and data word 3 of "write back data" from cache 2a and extracts data word 2 of "write back data" from cache 2b to merge those data words for merging write back data. Since data word 0 is not updated, it may be extracted from any of "write back data," or it could be possible not to write the word in the main memory.

Figure 13:
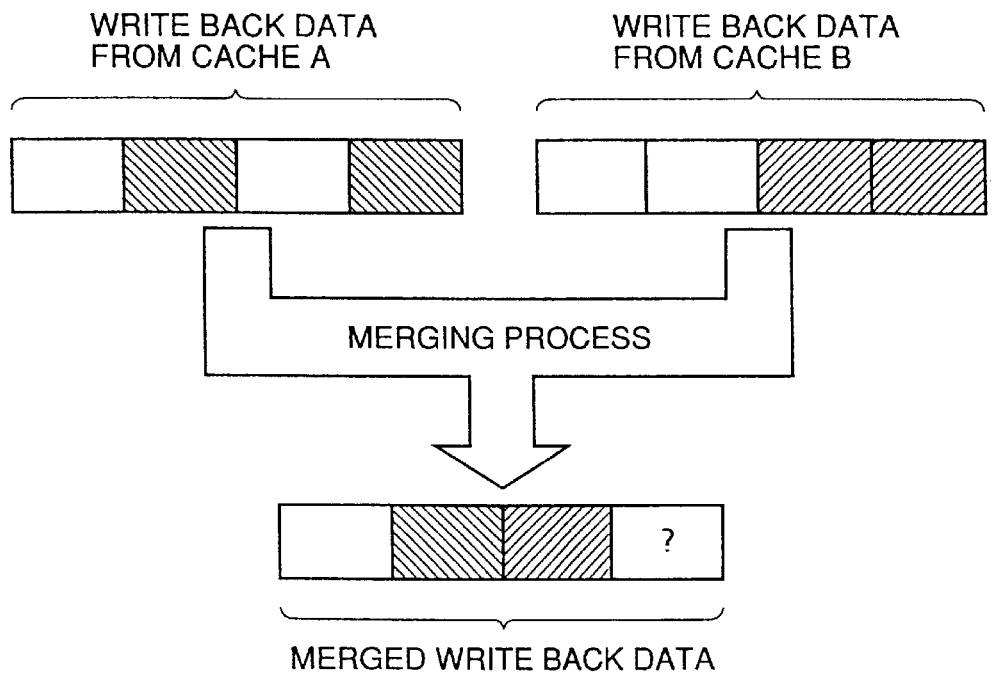
FIG. 13 illustrates a combination of write back data which could not happen.

FIG. 13 illustrates a combination which could not happen in the merging process. For example, suppose that data word 1 and data word 3 are updated in "write back data" from cache 2a and data word 2 and data word 3 are updated in "write back data" from cache 2b. In this case, both data words 3 are updated so that the merging process for data word 3 is impossible. However, on the weak memory consistency model, update of the same data word in the same memory block by different processors is inhibited in a process partitioned by synchronizing points. Therefore, the combination shown in FIG. 13 never happens.

Although the memory block illustrated in FIGS. 12 and 13 is shown that has the size of 4 words, and the merging process is done on the basis of a word, this process is not limited to that. The word size may be any such as 8, 16, 32 bits and the like.

By the operations described above of caches 2a and 2b and consistency control unit 5, when a cache entry of any cache is to be written back to main memory 3, cache entries of the same memory block of other caches in the multiprocessor device are simultaneously written back. In other words, when a cache entry of any cache is written back, all updates which have been done at that time are reflected on the memory block of main memory 3.

Figure 14:
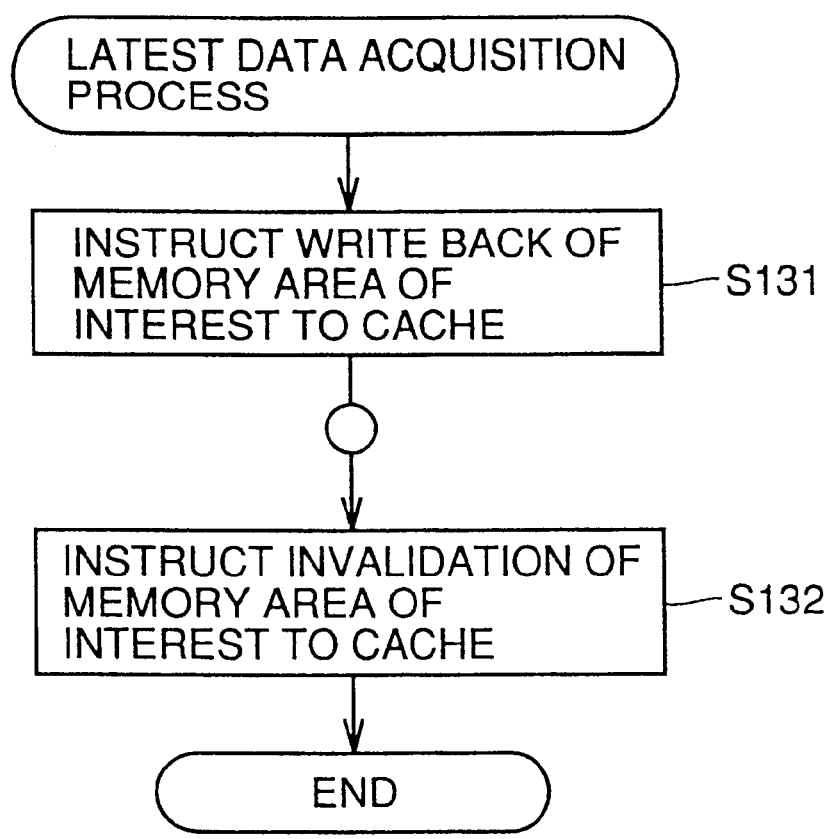
FIG. 14 illustrates a processing procedure of a processor according to the first embodiment of the invention.

FIG. 14 is a flow chart illustrating a procedure followed by processor 1a or 1b of an acquisition process for the latest data. When processor 1a or 1b is to acquire the latest data, processor 1a or 1b transmits "write back command" corresponding to a memory block having the latest data to be acquired to cache 2a or 2b (S131). After receiving "write back response" from cache 2a or 2b, processor 1a or 1b instructs invalidation of the cache entry of the memory block to cache 2a or 2b (S132). Accordingly, processor 1a or 1b can refer to the latest data of the memory block at the time indicated by ○ shown in FIG. 14.

In the multiprocessor device according to this embodiment, when a plurality of data words are contained in the same memory block, different processors can update the data words contained in the same memory block independently even if the false sharing occurs as described above. Consequently, delay of the processing due to unnecessary invalidation of data in false sharing can be avoided, and thus a multiprocessor device achieving a high speed processing while guaranteeing the memory consistency can be provided.

Although the description above is given using two processors in this embodiment, the multiprocessor device can be implemented similarly if the number of processors is equal to or more than 3.

(Second Embodiment)

A multiprocessor device in the second embodiment is different from the multiprocessor device in the first embodiment shown in FIG. 2 only in that caches 2a and 2b have an additional function and consistency control unit 5 also has an additional function. Therefore, a detailed description of the same structure and the function is not repeated. In the following description of the second embodiment, the caches have reference characters 2a' and 2b' and the consistency control unit has a reference character 5' for the purpose of description.

FIGS. 15 and 16 illustrate the contents of messages newly added in the multiprocessor device according to the second embodiment. "Invalidation request" is a message transmitted from a consistency control unit 5' to cache 2a' or 2b' for requesting invalidation of a cache entry of a memory block in cache 2a' or 2b'. Address information of the memory block to be subjected to an invalidation processing is attached to "invalidation request."

"Invalidation response" is a message transmitted from cache 2a' or 2b' to consistency control unit 5' as a response message to "invalidation request."

"Update data" is a message from consistency control unit 5' to cache 2a' or 2b' for requesting update of a cache entry of a memory block in cache 2a' or 2b'. Update data of the memory block and address information of the memory block subjected to the update processing are attached to "update data."

"Update response" is a message from cache 2a' or 2b' to consistency control unit 5' transmitted in response to "update data."

Figure 17:
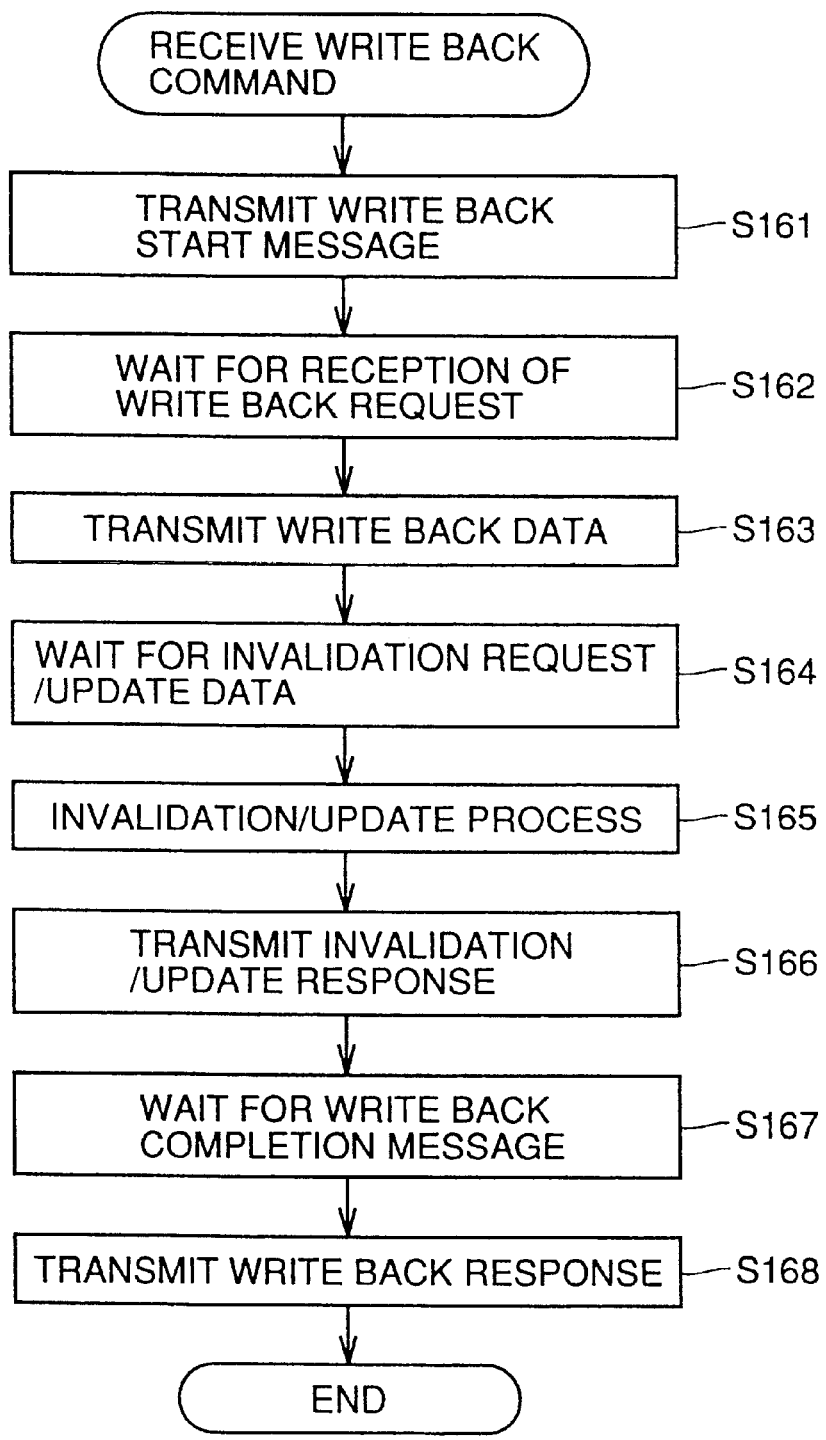
FIG. 17 is a flow chart illustrating a processing procedure of a cache according to the second embodiment of the invention.

FIG. 17 is a flow chart illustrating a processing procedure followed when cache 2a' or 2b' receives "write back command" from processor 1a or 1b. When cache 2a' or 2b' receives "write back command," it transmits "write back start message" to consistency control unit 5' (S161). The cache waits for transmission of "write back request" from consistency control unit 5' (S162).

When cache 2a' or 2b' receives "write back request" from consistency control unit 5', it transmits "write back data" to consistency control unit 5' (S163). The cache then waits for transmission of "invalidation request" or "update data" from consistency control unit 5' (S164).

When cache 2a' or 2b' receives "invalidation request" or "update data" from consistency control unit 5', it accordingly performs corresponding processes. Specifically, when the cache receives "invalidation request," it sets the valid bit V (see FIG. 6) of a cache entry of a memory block to be processed to "0" to invalidate the corresponding cache entry. If the cache receives "update data," it rewrites the cache entry of the memory block to be processed as the update data transmitted from consistency control unit 5' (S165).

Next, cache 2a' or 2b' transmits "invalidation response" or "update response" to consistency control unit 5' (S166), and waits for transmission of "write back completion message" from consistency control unit 5' (S167).

When cache 2a' or 2b' receives "write back completion message" from consistency control unit 5', it transmits "write back response" to processor 1a or 1b (S168) and this procedure is completed.

Figure 18:
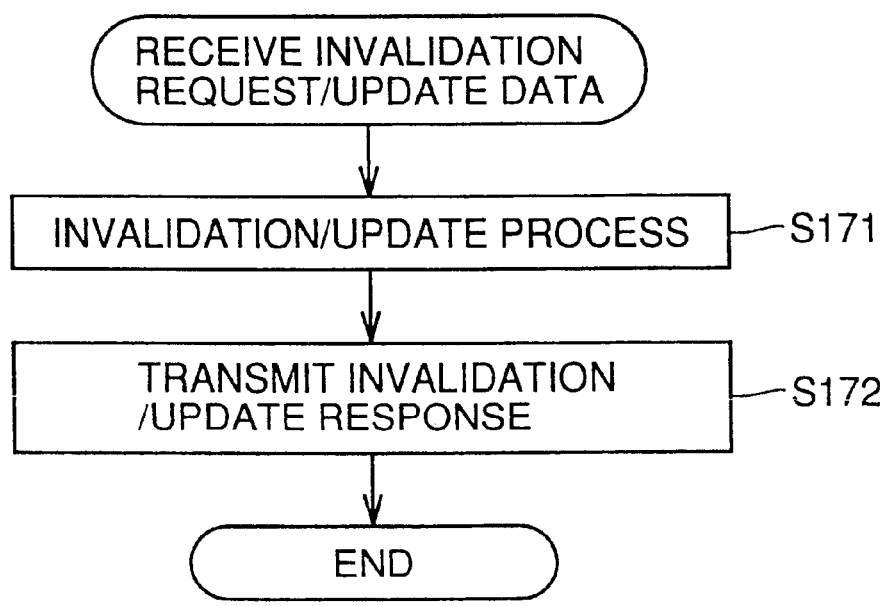
FIG. 18 is a flow chart illustrating a processing procedure of the cache when it receives an invalidation request or an update request.

FIG. 18 is a flow chart illustrating a processing procedure followed when cache 2a' or 2b' which does not receive "write back command" receives "invalidation request" or "updata." When cache 2a' or 2b' receives "invalidation request" or "updata," it executes a corresponding processing. Specifically, if cache 2a' or 2b' receives "invalidation request," it sets the valid bit V (see FIG. 6) of a cache entry of a memory block to be processed to "0" to invalidate the cache entry. If cache 2a' or 2b' receives "update data," it rewrites the cache entry of the memory block to be processed as the update data from consistency control unit 5' (S171). The cache then transmits "invalidation response" or "update response" to consistency control unit 5' (S172) to complete the processing.

Figure 19:
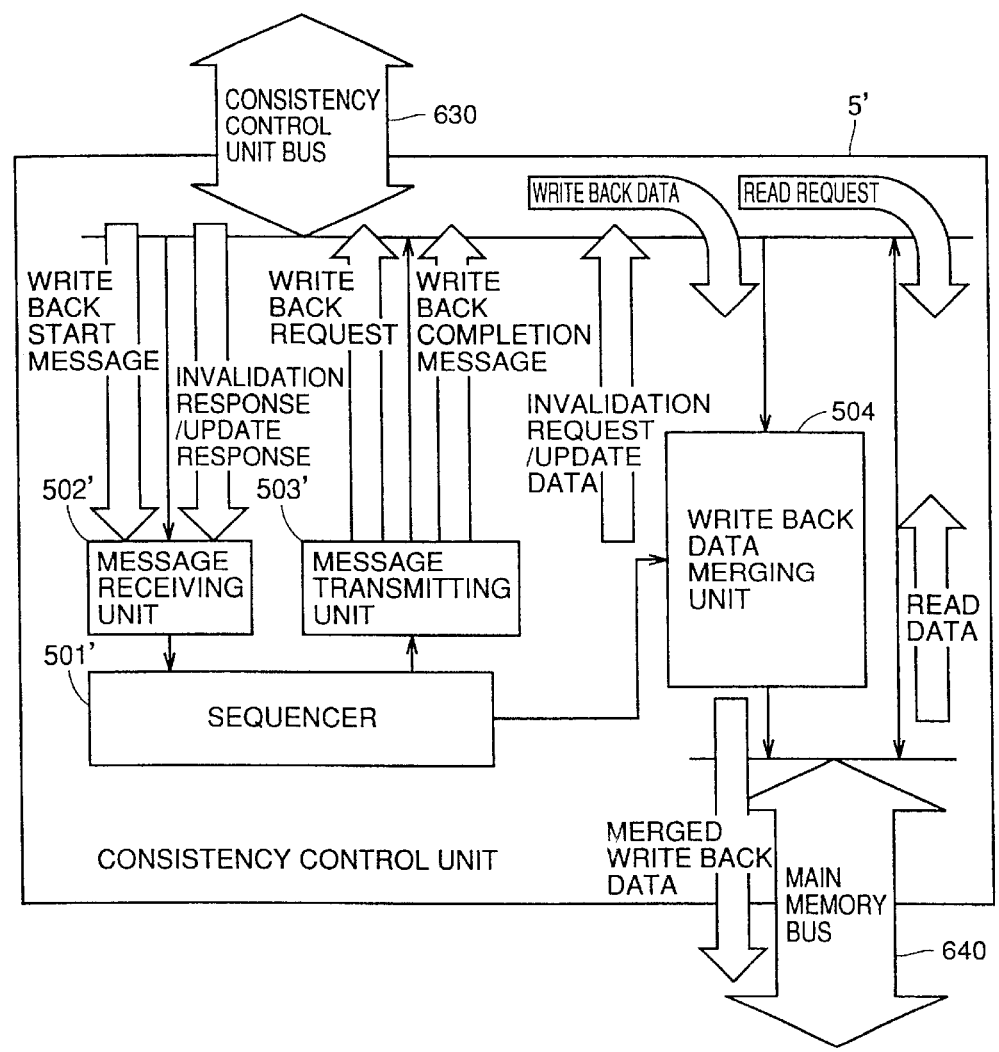
FIG. 19 is a schematic block diagram illustrating a structure of a consistency control unit 5' according to the second embodiment of the invention.

FIG. 19 is a schematic block diagram illustrating a structure of consistency control unit 5' of the multiprocessor device according to this embodiment. The consistency control unit 5' is different from consistency control unit 5 of the first embodiment shown in FIG. 10 only in that a message receiving unit 502' receives "invalidation response" or "update response," that a message transmitting unit 503' transmits "invalidation request" or "update data," and that the control of a sequencer 501' is different. Therefore, a detailed description of the same structure and function is not repeated here.

Figure 20:
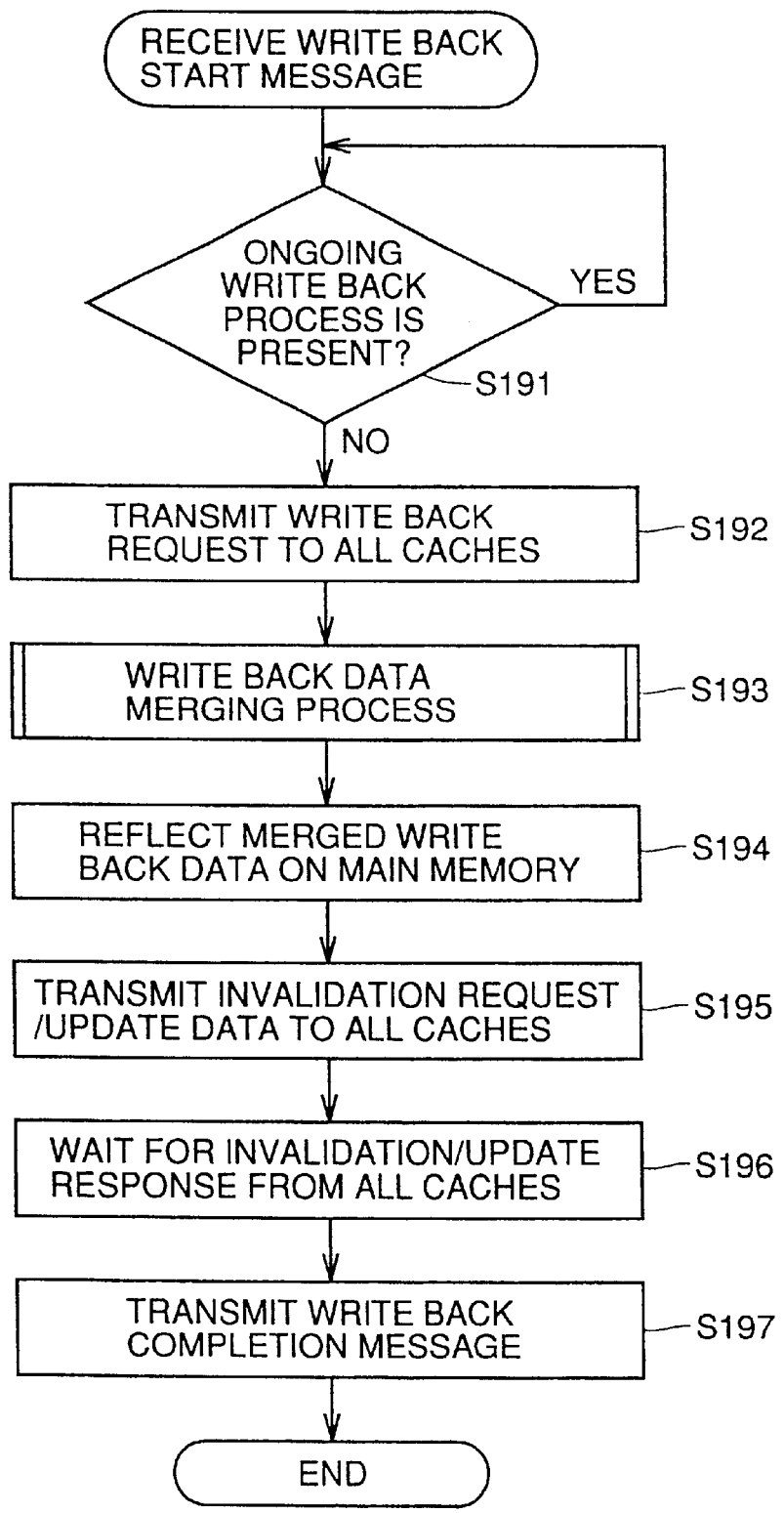
FIG. 20 is a flow chart illustrating a processing procedure of the consistency control unit 5'.

FIG. 20 is a flow chart illustrating a processing procedure followed when consistency control unit 5' in this embodiment receives "write back start message." When "write back start message" from cache 2a' or 2b' is received by message receiving unit 502', it is determined whether a write back processing for any other memory block is in progress or not (S191). If any write back processing is in progress (S191, Yes), the processing is suspended until the write back processing is completed. If there is no ongoing write back processing (S191, No), message receiving unit 502' starts sequencer 501' to allow message transmitting unit 503' to transmit "write back request" to all caches 2a' and 2b' (S192).

Sequencer 501' then starts write back data merging unit 504 to allow write back data merging unit 504 to perform a merging processing for write back data described in conjunction with FIG. 12 (S193), and the merged write back data is stored in main memory 3 via main memory bus 640 (S194). Sequencer 501' then causes message transmitting unit 503' to transmit "invalidation request" or "update data" to all caches 2a' and 2b' (S195), and waits for transmission of "invalidation response" or "update response" from all caches 2a' and 2b' (S196).

When message receiving unit 502' receives "invalidation response" or "update response" from all caches 2a' and 2b', sequencer 501' causes message transmitting unit 503' to transmit "write back completion message" to the cache which has transmitted "write back start message" (S197) to complete the processing.

Figure 21:
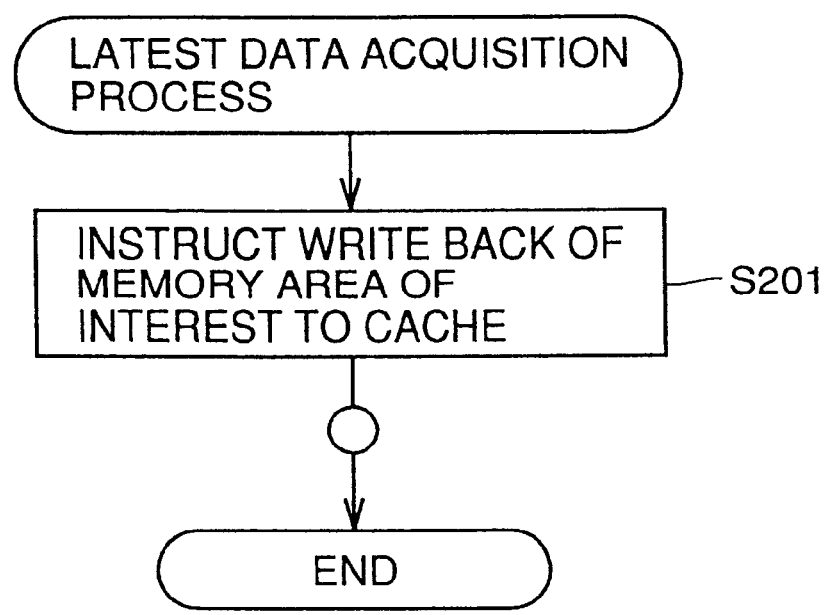
FIG. 21 illustrates a processing procedure of a processor according to the second embodiment of the invention.

FIG. 21 is a flow chart illustrating a processing procedure for a process of acquiring the latest data by the processor. Processor 1a or 1b transmits "write back command" for a memory block to be processed to cache 2a' or cache 2b', receives "write back response" from cache 2a' or 2b' (S201), and accordingly, the processing is completed. According to this processing, processor 1a or 1b can refer to the latest data of the memory block at the time indicated by ○ shown in FIG. 21.

If only one of the write back data obtained in response to "write back request" is updated, it is obvious that cache 2a' or 2b' which has transmitted the updated write back data contains the latest data. Therefore, consistency control unit 5' may not transmit "invalidation request" or "update data" to the corresponding cache in step S195 of FIG. 20 in order to decrease the number of messages. Similarly, if the cache starts the write back processing for replacement of a memory block due to cache miss, a copy of the memory block would apparently be discarded upon completion of the write back processing. Therefore, consistency control unit 5' may not transmit "invalidation request" or "update data" to the cache in order to decrease the number of messages.

In the multiprocessor device of this embodiment, the memory block in the cache is invalidated or updated during the write back processing by consistency control unit 5', so that the burden of the processing of the cache can be reduced when data in the memory block is accessed by the processor as described above.

(Third Embodiment)

A structure of a multiprocessor device according to the third embodiment is similar to that of the multiprocessor device according to the first embodiment or the second embodiment. The only difference is the function of write back data merging unit 504 in consistency control unit 5 or 5'. The write back data merging unit will be described by using a reference character of 504' and a detailed description of the same structure and function is not repeated here.

Figure 22:
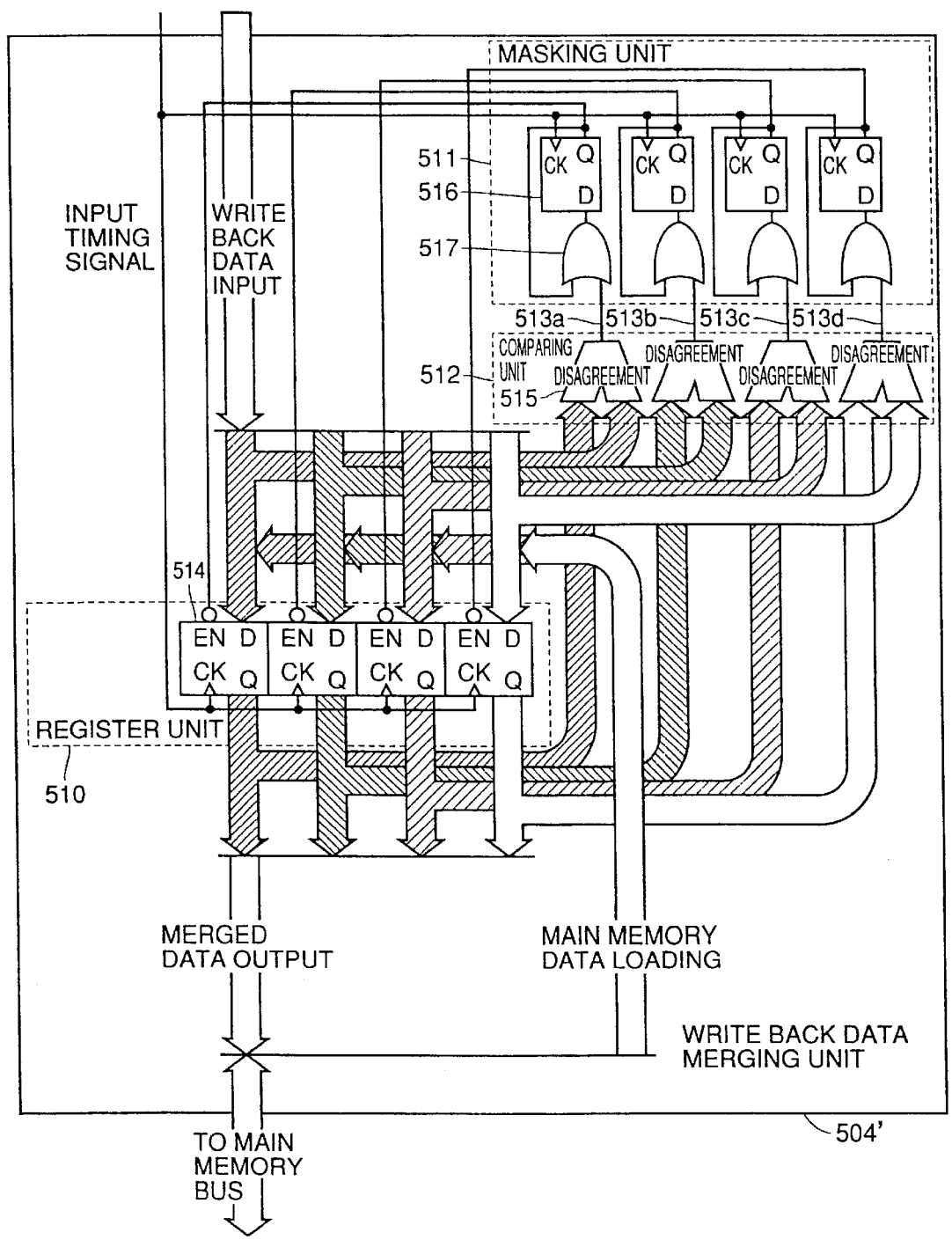
FIG. 22 is a schematic block diagram illustrating a structure of a write back data merging unit 504' according to the third embodiment of the invention.

FIG. 22 is a schematic block diagram illustrating a structure of a write back data merging unit 504' of this embodiment. Write back data merging unit 504' includes a register unit 510 for holding data corresponding to 4 words of write back data, a masking unit 511 for masking an EN signal of a D flip-flop array in register unit 510, and a comparing unit 512 for comparing a word supplied from register unit 510 with a word of write back data.

The D flip-flop takes input data from D in synchronization with an input timing signal CK when the EN signal is "0."

Register unit 510 contains four D flip-flop arrays corresponding to the data words. Comparing unit 512 contains four comparators comparing the data word supplied from register unit 510 with the data word of write back data.

Figure 23:
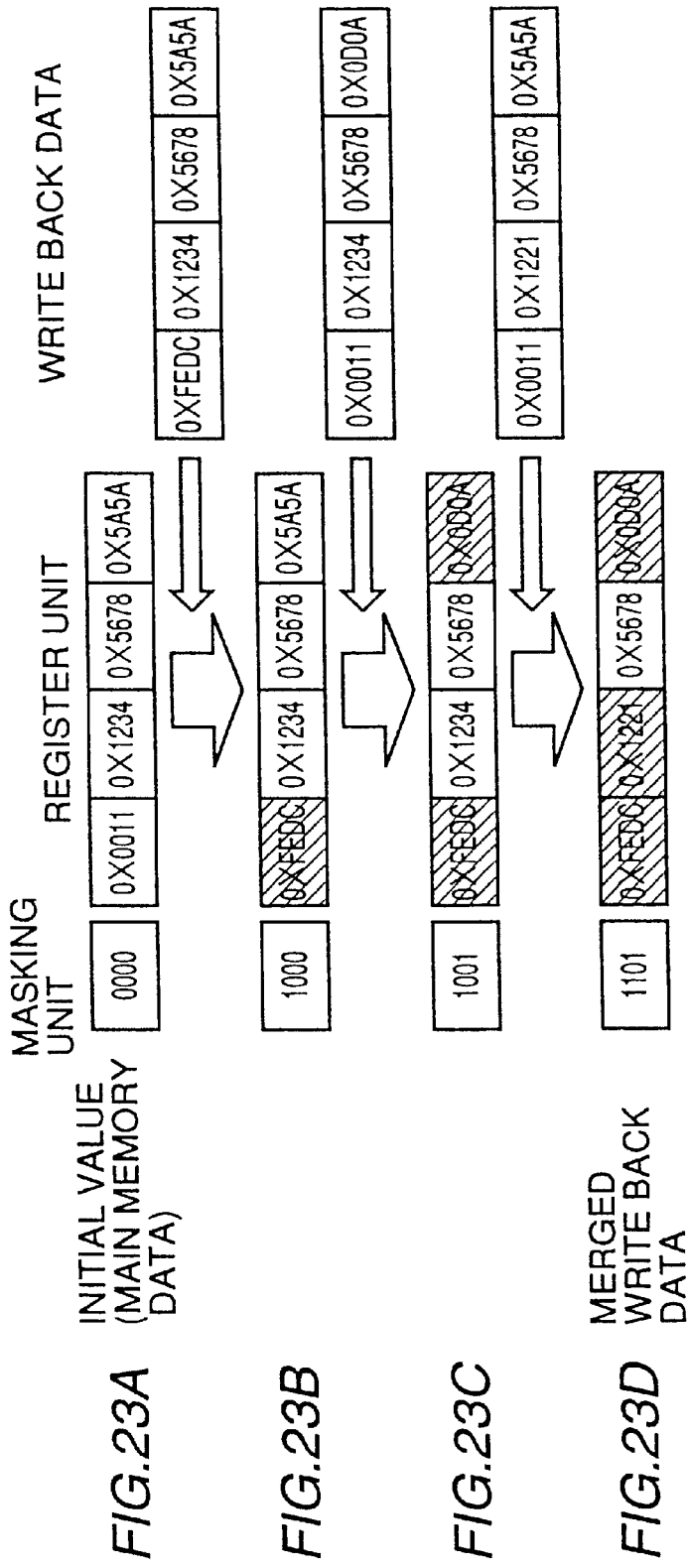
FIGS. 23A–23D illustrate an operation of the write back data merging unit 504'.

FIGS. 23A–23D illustrate an operation of write back data merging unit 504' shown in FIG. 22. First, the contents of a memory block are loaded from main memory 3 into register unit 510. As shown in FIG. 23A, all values of the D flip-flops in masking unit 511 are reset and values of the memory block in main memory 3 corresponding to write back data are loaded in register unit 510.

When write back data is supplied from the cache to write back data merging unit 504', among comparators in comparing unit 512, a comparator where disagreement occurs ahs an output of "1". Specifically, as shown in FIG. 23B, when disagreement occurs on only data word 0, an output of comparator 515 is "1" and an output of an OR circuit 517 is also "1". When the input timing signal is supplied, the contents of write back data are held in the D flip-flop array in register unit 510, and an output Q of D flip-flop 516 in masking unit 511 is "1". Since the EN signal of D flip-flop array 514 is "1", the contents held by the flip-flop will not be updated when an input timing signal is subsequently supplied to D flip-flop array 514, and according the contents of data word 0 of the first write back data are held. The contents of masking unit 511 and register unit 510 at this time are shown in FIG. 23B.

Figure 24:
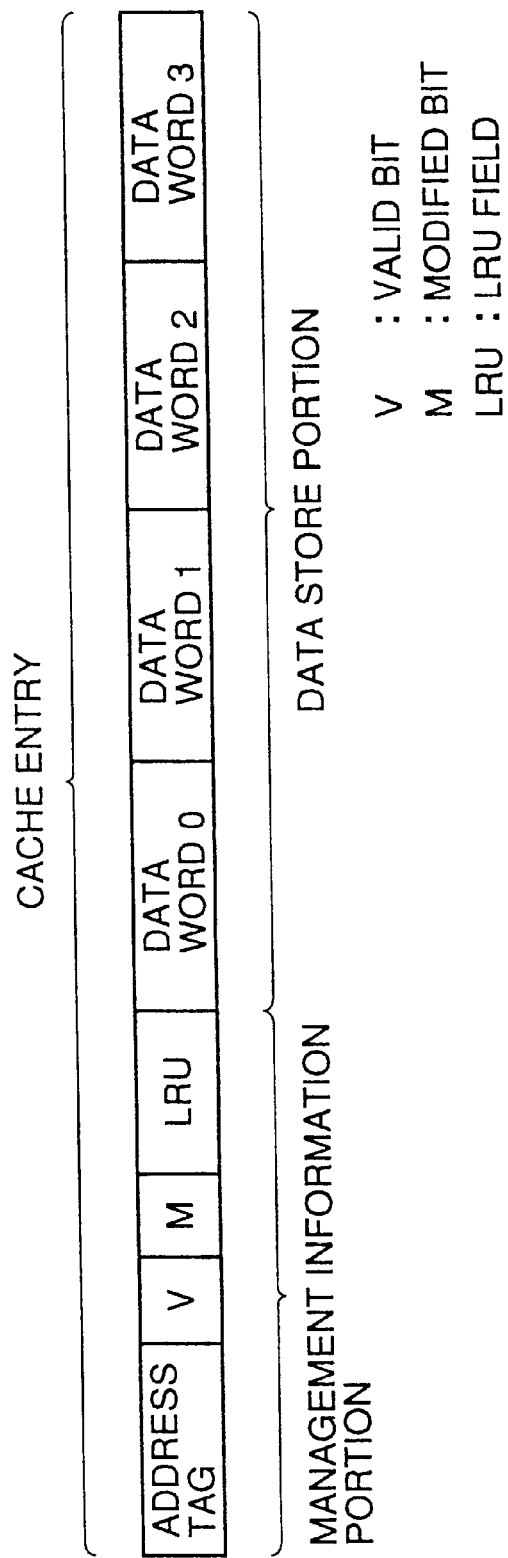
FIG. 24 illustrates contents of a cache entry according to the third embodiment of the invention.

Referring to FIG. 23C, data word 3 is updated, and data word 1 is updated as shown in FIG. 23D and thus merging process of write back data is completed. Information concerning which data word in each write back data is updated is thus unnecessary so that the contents of information for managing the cache entry in the cache can be reduced as shown in FIG. 24. Specifically, indication of which data word is updated by a modified bit is not required, and it is enough to show that any of the data words is updated by modified bit M.

Further, it is not necessary for "write back data" to contain the update status of each word and it is accordingly enough for "write back data" to contain the information on whether or not the cache entry is entirely updated. Therefore, the information attached to the message shown in FIG. 4 is changed as shown in FIG. 25.

In the multiprocessor device according to this embodiment, the modified bit corresponding to each data word in the cache becomes unnecessary and the data capacity of the cache can be effectively utilized. Further, the processing in the write back data merging unit in the consistency control unit can easily be formed as hardware.

(Fourth Embodiment)

A multiprocessor device of the fourth embodiment has a structure similar to that of the multiprocessor device according to the first or the second embodiment. The only difference is the structure and function of write back data merging unit 504 in consistency control unit 5 or 5'. A detailed description of the same structure and function is not repeated here. A write back data merging unit in this embodiment is referred to as 504" for description.

Figure 26:
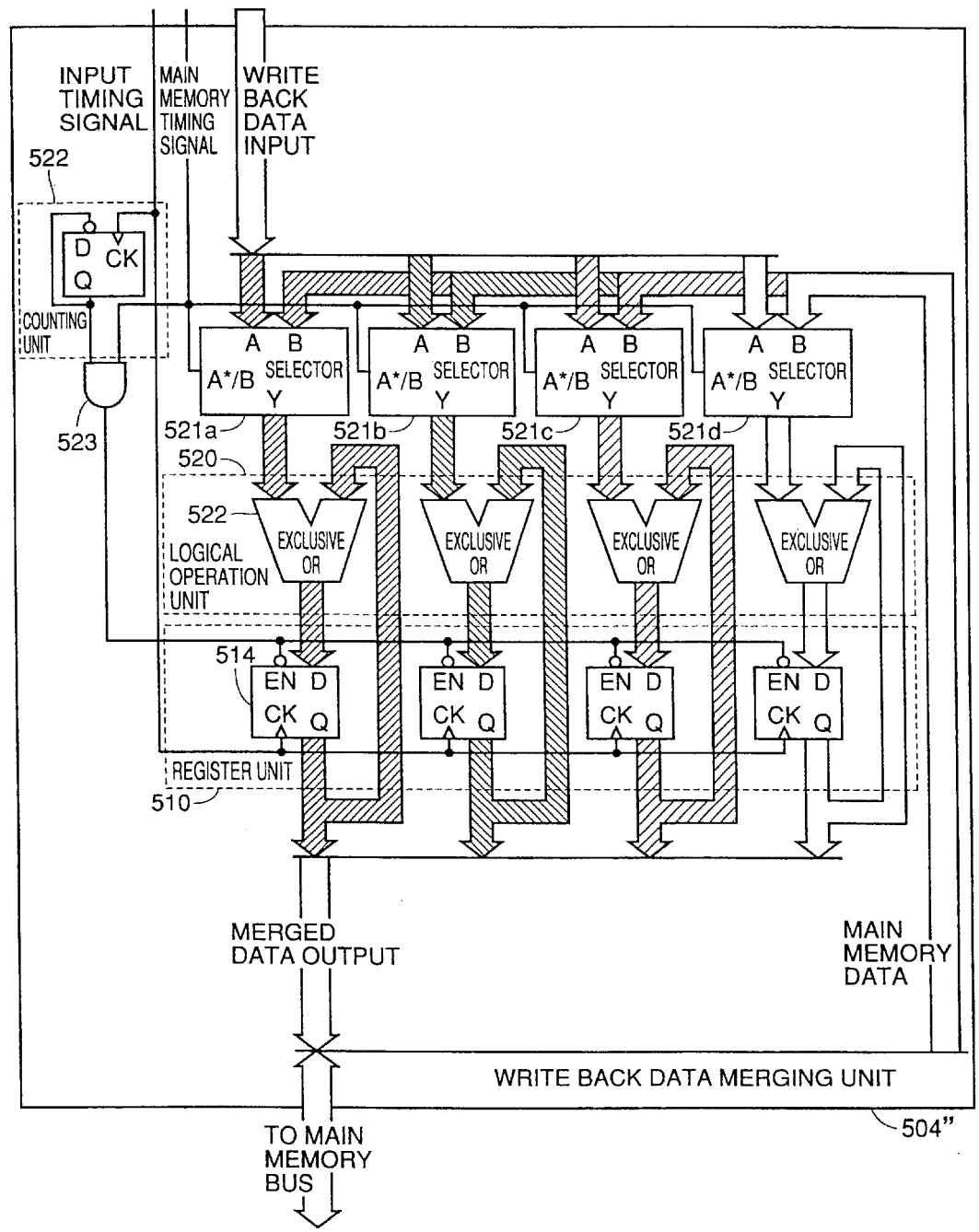
FIG. 26 is a schematic block diagram illustrating a structure of a write back data merging unit 504" according to the fourth embodiment of the invention.

FIG. 26 is a schematic block diagram illustrating a structure of write back data merging unit 504". Write back data merging unit 504" includes a register unit 510 for holding contents of 4 data words, selectors 521a–521d for selecting data words individually of write back data and of a memory block read from main memory 3 and outputting a selected one, a logical operation unit 520 for performing exclusive OR of a data word supplied from register unit 510 and a data word supplied from selectors 521a–521d bit by bit, a counting unit 522 formed of 1 bit counter, and an AND circuit 523.

Register unit 510 and counting unit 522 are entirely reset at the start of the merging process for write back data. At this time, a main memory timing signal is "0," and selectors 521a–521d select write back data and output it. When consistency control unit 5 or 5' receives write back data, the write back data is input to selectors 521a–521d, and an input timing signal in synchronization with the input of write back data is supplied to register unit 510 and counting unit 522.

FIGS. 27A–27D illustrate an operation of write back data merging unit 504" shown in FIG. 26. As shown in FIG. 27A, all bits are set to "0" as an initial value in register unit 510. When the first write back data is supplied from the cache, the write back data is selected by selectors 521a–521d, and the write back data is input to logical operation unit 520. For example, exclusive OR 522 receiving data word 0 executes exclusive OR of data word 0 of the write back data and a data word supplied from D flip-flop array 514 in register unit 510 bit by bit, and the result is held in D flip-flop array 514 upon rising of the input timing signal. The result of the arithmetic operation is shown in FIG. 27B.

When the second write back data is supplied, the process similar to that performed when the first write back data is received is carried out, and the result of the operation is illustrated in FIG. 27C. When the third write back data is supplied, the process proceeds similarly and the operation result is shown in FIG. 27D.

When all write back data are supplied, the main memory timing signal becomes "1," and selectors 521a–521d select the main memory data and output it. However, counting unit 522 has an output of "1" and the main memory timing signal is also "1," so that AND circuit 523 outputs "1" and the EN signal of each D flip-flop array in register unit 510 is "1." Therefore, even if the input timing signal rises, the contents of register unit 510 would not be updated and those values shown in FIG. 27D are resultant values of merged write back data to be output from write back data merging unit 504".

Figures 28A, 28B, 28C, 28D:
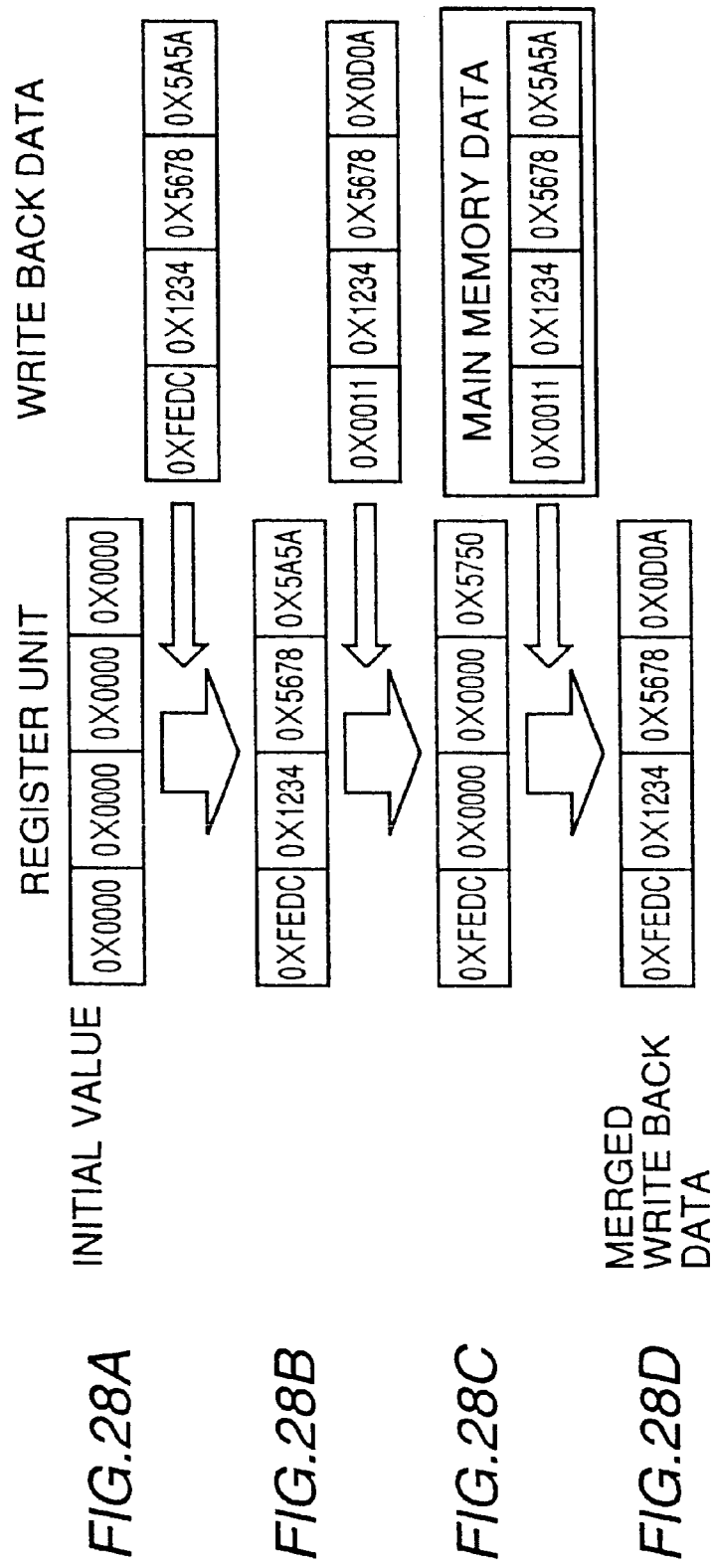
FIGS. 28A–28D illustrate an operation of the write back data merging unit 504" (Example 2).

FIGS. 28A–28D illustrate an operation of write back data merging unit 504" when the number of write back data is 2. As the process described in conjunction with FIGS. 27A–D, FIG. 28A shows initial values of register unit 510, FIG. 28B shows the result of operation by logical operation unit 520 when the first write back data is supplied, and FIG. 28C shows the result of operation by logical operation unit 520 when the second write back data is supplied.

An output of counting unit 522 is "0" after the second write back data is supplied, and AND circuit 523 outputs "0" even if the main memory timing signal is "1." Accordingly, selectors 521a–521d select the main memory data and output the data, logical operation unit 520 performs exclusive OR of the data word supplied from register unit 510 and the data word of the main memory data bit by bit, and the result is held in register unit 510 at the rising of the input timing signal. The operation result at this time is shown in FIG. 28D and this result is supplied from write back data merging unit 504".

In the multiprocessor device according to this embodiment, the cache entry can be implemented as that shown in FIG. 24 similarly to the multiprocessor device of the third embodiment. Therefore, each cache can effectively utilize the capacity of the cache memory and write back data merging unit 504" in the consistency control unit can be realized by simple hardware.

(Fifth Embodiment)

Figure 29:
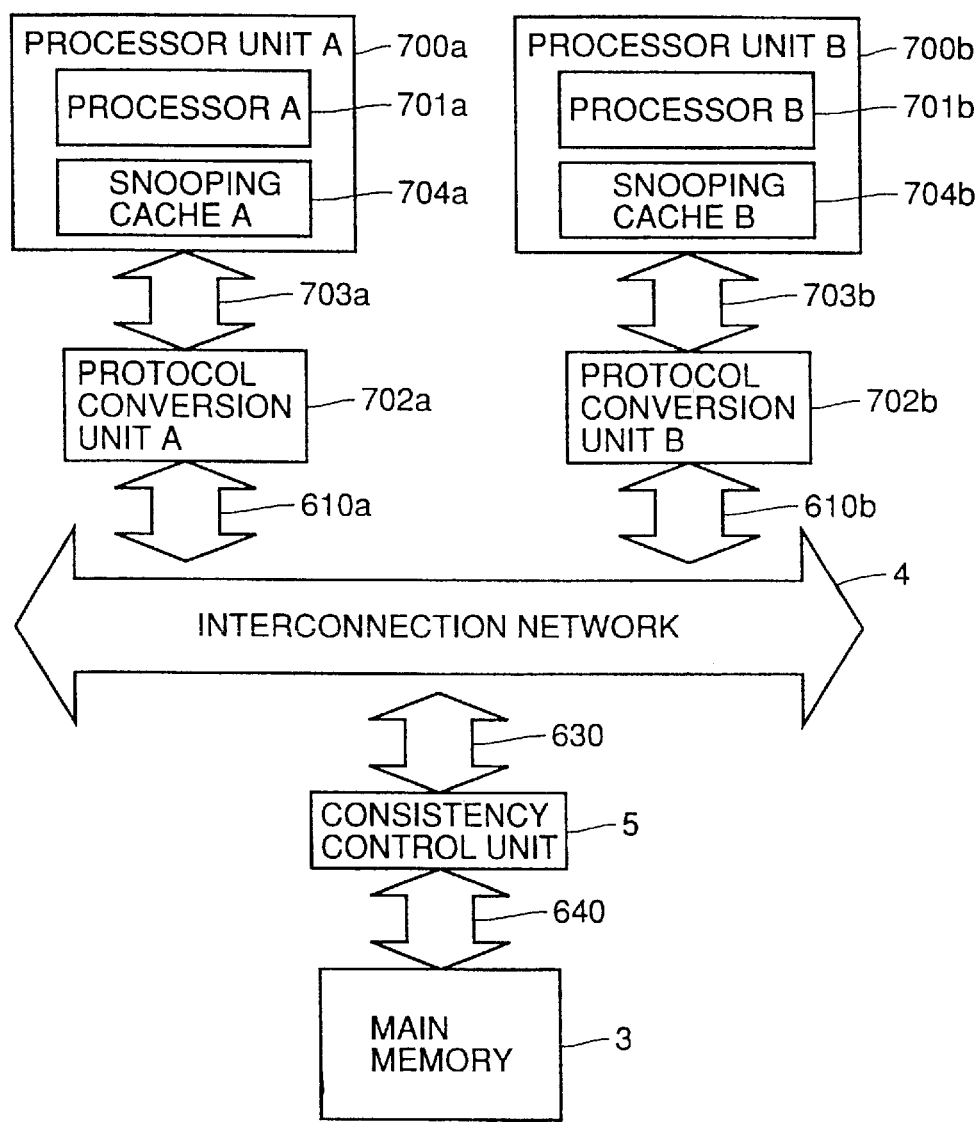
FIG. 29 is a schematic block diagram illustrating a structure of a multiprocessor device according to the fifth embodiment of the invention.

FIG. 29 is a schematic block diagram illustrating a structure of a multiprocessor device according to the fifth embodiment. The multiprocessor device of this embodiment is similar to the multiprocessor device of the third or fourth embodiment. The only difference is that processors 1a and 1b, caches 2a and 2b, and processor buses 620a and 620b are respectively replaced with processor units 700a and 700b, protocol conversion units 702a and 702b, and snooping buses 703a and 703b. The detailed description of the same structure and function is not repeated here.

In many existing microprocessors, not only a processor itself but a snooping cache is merged into the chip or module. Although the snooping cache does not allow the presence of a plurality of write privileges, it is merged into the same chip or the same module to exhibit a superior performance in terms of the operating speed, power consumption, and cost.

Processor units 700a and 700b here are considered as the existing microprocessors, having merged processors 701a and 701b and snooping caches 704a and 704b respectively. Protocol conversion units 702a and 702b convert bus transactions on snooping buses 703a and 703b to messages on cache buses 610a and 610b and vice versa. Snooping cache 704a or 704b merged into processor unit 700a or 700b does not usually have modified bits for respective data words, and has only one modified bit per cache entry. Therefore, a consistency control unit 5 should have write back data merging unit 504' or 504" as shown in the third or fourth embodiment.

Figure 30:
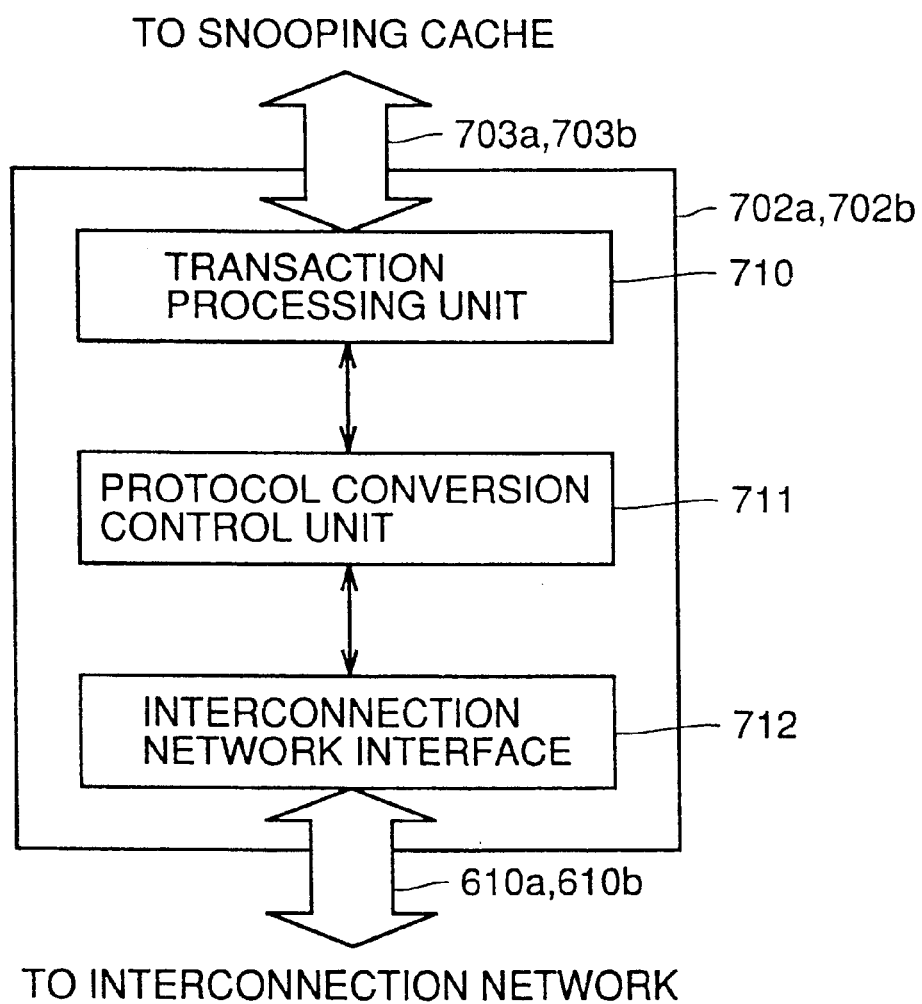
FIG. 30 is a schematic block diagram illustrating a structure of protocol conversion units 702*a* and 702*b*.

FIG. 30 is a schematic block diagram illustrating a structure of protocol conversion units 702a and 702b. Protocol conversion units 702a and 702b include a transaction processing unit 710 for performing processing corresponding to any transaction generated on snooping buses 703a and 703b, a protocol conversion control unit 711 for the entire control of protocol conversion, and an interconnection network interface 712 connected to an interconnection network 4 via a cache bus 610a or 610b.

In this embodiment, a write back command is generated by processor 701a or 701b which writes, as data, an address of a memory block to be written back to a special address assigned in an I/O (Input/Output) region.

Figure 31:
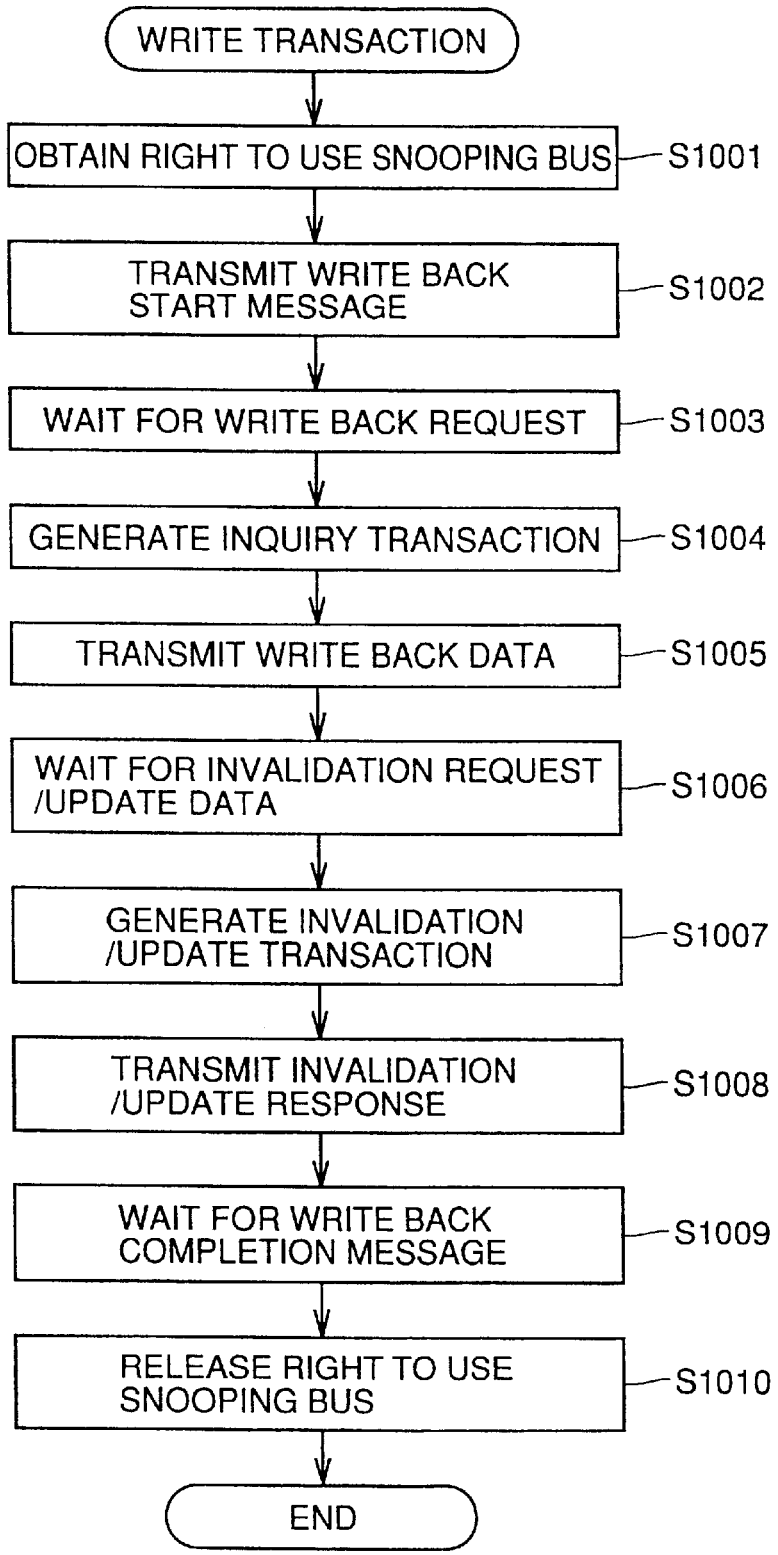
FIG. 31 is a flow chart illustrating a processing procedure of protocol conversion units 702*a* and 702*b* followed when write transaction occurs.

FIG. 31 is a flow chart illustrating a processing procedure followed by protocol conversion unit 702a or 702b when write transaction to this special address is generated on snooping bus 703a or 703b, equivalent to the processing shown in FIG. 17.

Protocol conversion unit 702a or 702b exchanges messages necessary for the write back process and has the exclusive right to use snooping bus 703a or 703b during a period from generation of the write transaction to completion of the write back process. Since protocol conversion unit 702a or 702b exclusively has the right to use snooping bus 703a or 703b, processor unit 700a or 700b is unable to newly generate a bus transaction. Accordingly, even if the existing processor unit having no mechanism for receiving the write back response is employed, an operation similar to the operation of the processor unit which can receive a notice that the write back process is completed is possible.

Transaction processing unit 710 obtains the right to use snooping bus 703a or 703b when the write transaction is generated, and prohibits generation of a new bus transaction (S1001). Protocol conversion control unit 711 transmits "write back start message" containing an address of a specified memory block to consistency control unit 5 via interconnection network interface 712 (S1002). Protocol conversion control unit 711 then waits for transmission of "write back request" from consistency control unit 5 (S1003).

Receiving "write back request" from consistency control unit 5, protocol conversion control unit 711 allows transaction processing unit 710 to generate an inquiry transaction (S1004). The inquiry transaction is generated for supplying an address of a memory block to snooping caches 704a and 704b, and inquiring about information on a corresponding cache entry. Receiving the inquiry transaction, snooping caches 704a and 704b send back information indicating whether the cache entry exists or not. If the cache entry exists, the information indicating whether the cache entry is updated or not is also sent back. Further, snooping caches 704a and 704b output data of the cache entry, if the cache entry is present and updated.

If snooping cache 704a or 704b does not have the cache entry, or has the cache entry which is not updated, protocol conversion control unit 711 transmits clean "write back data" to consistency control unit 5. If snooping cache 704a or 704b has the cache entry which is updated, protocol conversion control unit 711 transmits "write back data" containing the updated data to consistency control unit 5 (S1005). Protocol conversion control unit 711 then waits for transmission of "invalidation request" or "update data" from consistency control unit 5 (S1006)

Receiving "invalidation request" or "update data" from consistency control unit 5, protocol conversion control unit 711 performs corresponding processes. Specifically, when protocol conversion control unit 711 receives "invalidation request," transaction processing unit 710 supplies the address of the memory block to snooping caches 704a and 704b to invalidate a corresponding cache entry. When protocol conversion control unit 711 receives "update data," transaction processing unit 710 supplies the address of the memory block and update data to snooping caches 704a and 704b to update a corresponding cache entry (S1007).

Protocol conversion control unit 711 then transmits "invalidation response" or "update response" to consistency control unit 5 (S1008), and waits for transmission of "write back completion message" from consistency control unit 5 (S1009). Receiving "write back completion message" from consistency control unit 5, protocol conversion control unit 711 releases the right to use snooping buses 703a and 703b (S1010) to complete this process.

Figure 32:
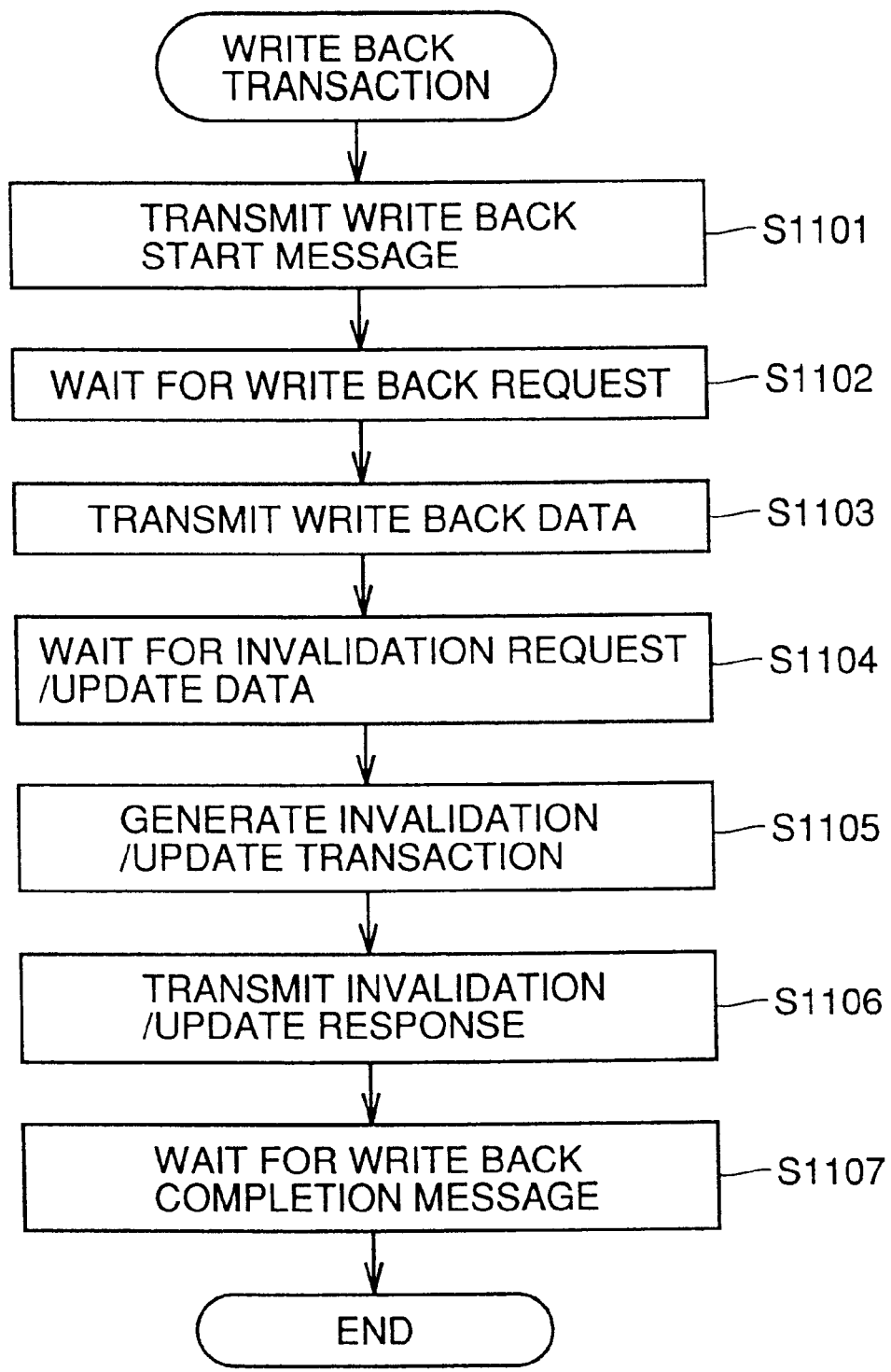
FIG. 32 is a flow chart illustrating a processing procedure of protocol conversion units 702*a* and 702*b* followed when write back transaction occurs.

FIG. 32 is a flow chart illustrating a processing procedure of protocol conversion units 702a and 702b when the write back transaction is generated on snooping bus 703a or 703b. The write back transaction refers to the transaction generated when the capacity of snooping cache 704a or 704b becomes insufficient, carried out by outputting an address of a memory block to be written back and updated data by snooping cache 704a or 704b.

When transaction processing unit 710 detects generation of the write back transaction on snooping bus 703a or 703b, protocol conversion control unit 711 transmits "write back start message" to consistency control unit 5 (S101). Protocol conversion control unit 711 then waits for transmission of "write back request" from consistency control unit 5 (S1102).

Receiving "write back request" from consistency control unit 5, protocol conversion control unit 711 transmits "write back data" including updated data to consistency control unit 5 (S1103). Protocol conversion control unit 711 then waits for transmission of "invalidation request" or "update data" from consistency control unit 5 (S1104).

Protocol conversion control unit 711 then transmits "invalidation response" or "update response" to consistency control unit 5 (S1106), and waits for transmission of "write back completion message" from consistency control unit 5. Since the cache entry written back by the write back transaction should be discarded, it is unnecessary to invalidate or update the cache entry. When protocol conversion control unit 711 receives "write back completion message" from consistency control unit 5, this process is completed.

Figure 33:
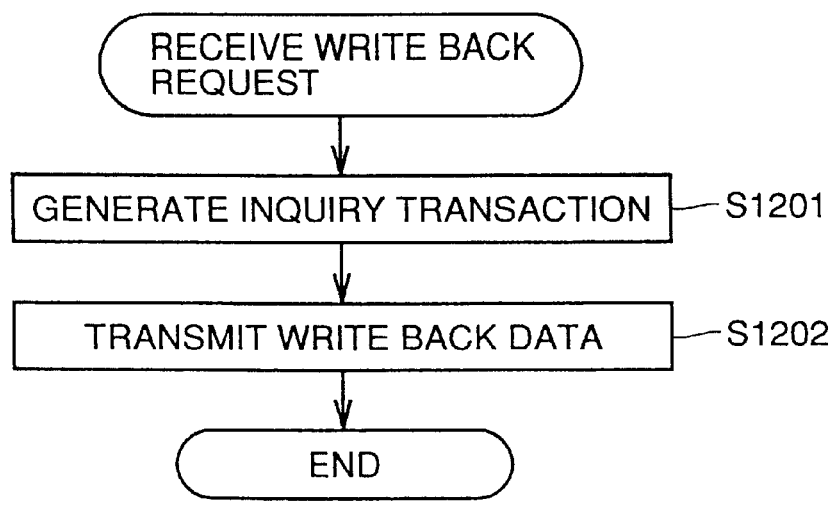
FIG. 33 is a flow chart illustrating a processing procedure of protocol conversion units 702*a* and 702*b* followed when "write back request" occurs.

FIG. 33 is a flow chart illustrating a processing procedure followed by protocol conversion unit 702a or 702b when "write back request" is generated on cache bus 610a or 610b, equivalent to the processing-illustrated in FIG. 9.

When protocol conversion control unit 711 receives "write back request" from consistency control unit 5, it allows transaction processing unit 710 to generate inquiry transaction (S1201). If a cache entry corresponding to "write back request" is not present or the memory block is not updated, it transmits clean "write back data" to consistency control unit 5. If a cache entry corresponding to "write back request" exists and the memory block is updated, protocol conversion control unit 711 supplies "write back data" including the updated data to consistency control unit 5 (S1202), and accordingly this process is completed.

Figure 34:
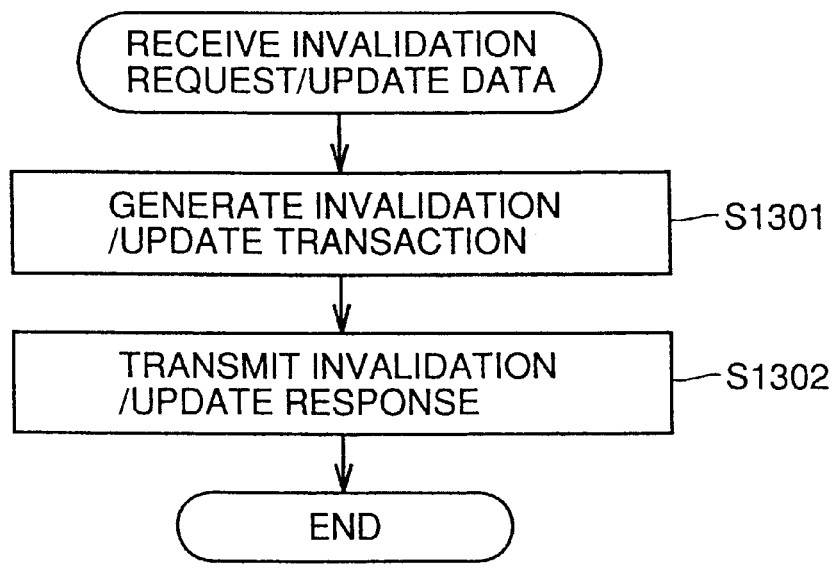
FIG. 34 is a flow chart illustrating a processing procedure of protocol conversion units 702*a* and 702*b* followed when "invalidation request" or "update data" occurs.

FIG. 34 is a flow chart illustrating a processing procedure by protocol conversion unit 702a or 702b when "invalidation request" or "update data" is generated on cache bus 610a or 610b, equivalent to the processing illustrated in FIG. 18.

Protocol conversion control unit 711 receives "invalidation request" or "update data" from consistency control unit 5 to perform a corresponding processing. Specifically, if protocol conversion control unit 711 receives "invalidation request," transaction processing unit 710 supplies the address of the memory block to snooping cache 704a or 704b to invalidate a corresponding cache entry. If protocol conversion control unit 711 receives "update data," transaction processing unit 710 supplies the address of the memory block and update data to snooping cache 704a or 704b to update a corresponding cache entry (S1301). Protocol conversion control unit 711 transmits to consistency control unit 5 "invalidation response" or "update response" to complete this process.

As heretofore described, in the multiprocessor device of this embodiment, the existing processor unit having the merged processor and snooping cache is utilized, and the protocol conversion unit converting the transaction on the snooping bus to the message on the cache bus and vice versa is provided. The multiprocessor device can thus be implemented to have an excellent performance in terms of the operating speed, power consumption, and cost.

(Sixth Embodiment)

Figure 35:
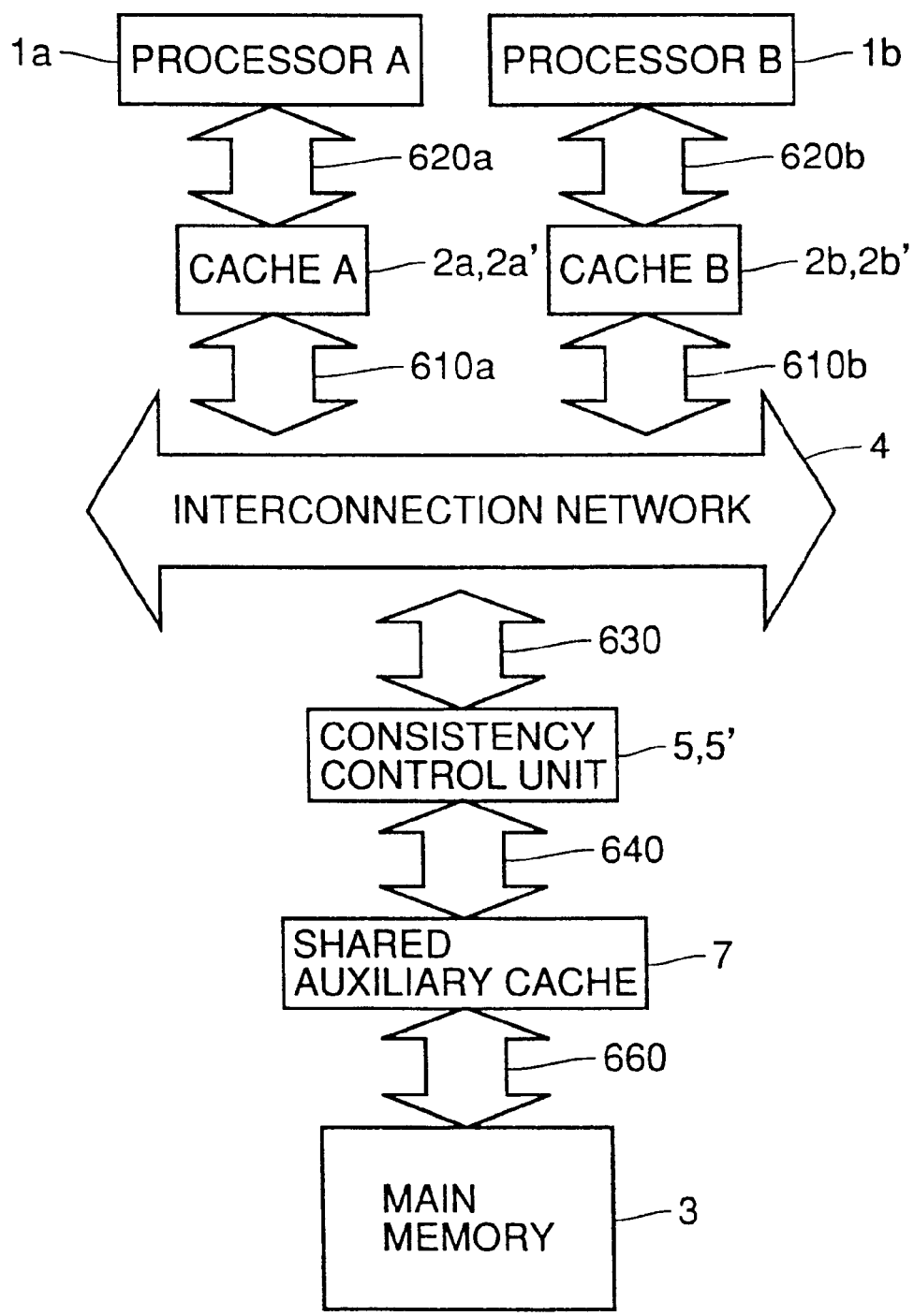
FIG. 35 is a schematic block diagram illustrating a structure of a multiprocessor device according to the sixth embodiment of the invention.

FIG. 35 is a schematic block diagram illustrating a structure of a multiprocessor device according to the sixth embodiment. This multiprocessor device is different from the multiprocessor device of the first embodiment shown in FIG. 2 or the multiprocessor device of the second to the fourth embodiments in that a shared auxiliary cache 7 is provided between consistency control unit 5 or 5' and main memory 3. A detailed description of the same structure and function is not repeated here.

In the multiprocessor device according to the first to fourth embodiments, consistency control unit 5 or 5' makes access to data in main memory 3 for proceeding with the processing. Consistency control unit 5 or 5' in this embodiment instead makes access to data in shared auxiliary cache 7. Shared auxiliary cache 7 makes access to main memory 3 via a shared auxiliary cache bus 660 only when the cache miss occurs. Generally the access speed of shared auxiliary cache 7 is higher than that of the main memory 3 so that the function of the entire multiprocessor device improves. Further, consistency control unit 5 or 5' in the multiprocessor device according to the third and fourth embodiments reads data from main memory 3 in the merging process of write back data. Therefore, the speed of the merging process can be enhanced by incorporating shared auxiliary cache 7. Although shared auxiliary cache 7 may follow the write back or the write through system, the write back cache is desirable for decreasing the number of times of writing to main memory 3.

Regarding the relation between cache 2a, 2a', 2b or 2b' and shared auxiliary cache 7, there are two control methods. According to one control method, a memory block stored in the cache is always stored in the auxiliary cache. According to the other method, a memory block stored in the cache is not necessarily stored in auxiliary cache 7. A shared auxiliary cache according to the former control method is hereinafter referred to as full auxiliary cache, and a shared auxiliary cache according to the latter control method is referred to as partial auxiliary cache in the following description. In the multiprocessor device employing the full auxiliary cache, consistency control unit 5 or 5' can always obtain data from shared auxiliary cache 7 in the write back data merging process. Therefore, the contents of main memory 3 are not referred to and the speed of the merging process is enhanced. In the multiprocessor device employing the partial auxiliary cache, the capacity of shared auxiliary cache 7 can be made smaller than the total capacity of the cache, so that the circuit scale of shared auxiliary cache 7 can be reduced.

(Seventh Embodiment)

Figure 36:
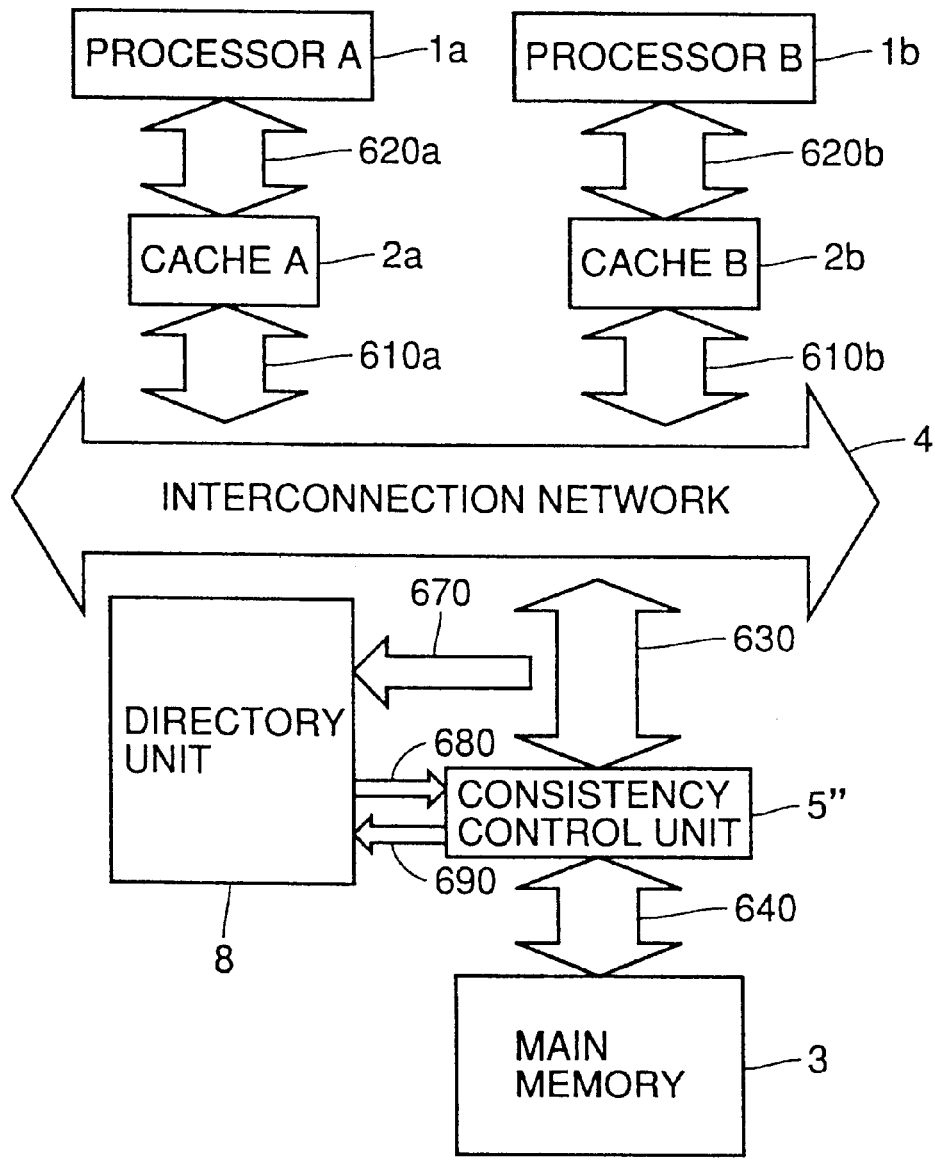
FIG. 36 is a schematic block diagram illustrating a structure of a multiprocessor device according to the seventh embodiment of the invention.

FIG. 36 is a schematic block diagram illustrating a structure of a multiprocessor device according to the seventh embodiment. The multiprocessor device in the sixth embodiment is different from the multiprocessor device in the first embodiment shown in FIG. 2 only in that a directory unit 8 is added and consistency control unit 5 has an additional function. A detailed description of the same structure and function is not repeated here. A consistency control unit in this embodiment will be described by a reference number 5". Directory unit 8 monitors messages communicated between cache 2a or 2b and consistency control unit 5" through consistency control unit bus 630 to hold the state of a memory block in each cache.

Figure 37:
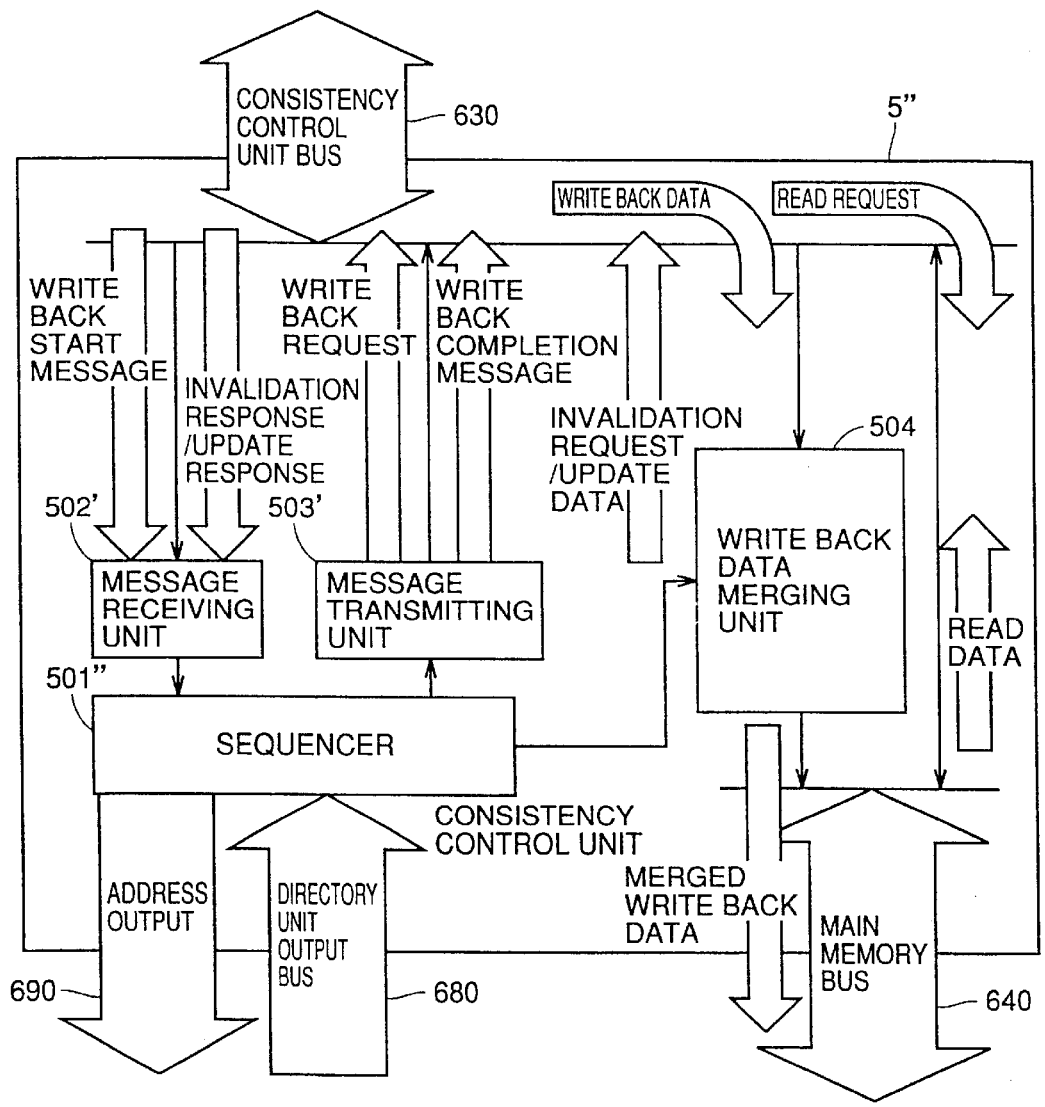
FIG. 37 is a schematic block diagram illustrating a structure of a consistency control unit 5" according to the seventh embodiment of the invention.

FIG. 37 is a schematic block diagram illustrating a structure of consistency control unit 5" in this embodiment. Consistency control unit 5" in this embodiment is different from consistency control unit 5' in the second embodiment shown in FIG. 19 only in that a sequencer 501" has an additional function of outputting an address corresponding to a memory block to directory unit 8 and receiving the state of the corresponding memory block in each cache via a directory unit output bus 680. A detailed description of the same structure and function is not repeated here.

Figures 38, 39:
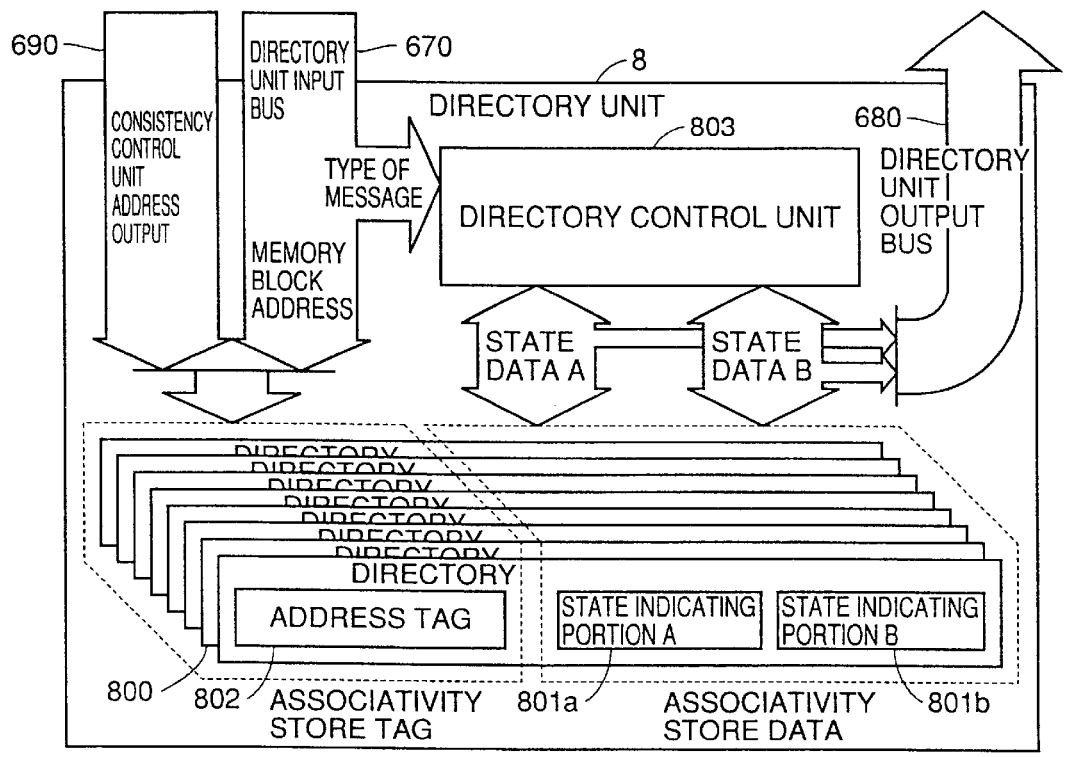
FIG. 38 is a schematic block diagram illustrating a structure of a directory unit 8.
FIG. 39 illustrates a relation between the content of a state indication unit in the directory unit 8 and the state of a corresponding cache.

FIG. 38 is a schematic block diagram illustrating a structure of directory unit 8 in this embodiment. Directory unit 8 includes a plurality of directory entries 800 and a directory control unit 803 for the entire control of directory unit 8. Directory control unit 803 monitors messages (see FIGS. 3, 4, 15 and 16) passed through consistency control unit bus 630 via a directory unit input bus 670 in order to store the address and the state of the memory block held in cache 2a and 2b each, in an address tag 802 as well as a state indicating portion A and a state indicating portion B in directory entry 800. When the contents of the directory entry are referenced by consistency control unit 5", the state of a memory block corresponding to an address output 690 is supplied via a directory unit output bus 680.

FIG. 39 illustrates the state of a memory block in a cache corresponding to the content of state indicating portion A or B. When the content of the state indicating portion is "invalid," the cache does not hold a copy of a memory block corresponding to an address tag. When the content of the state indicating portion is "clean," the cache has a copy of a memory block corresponding to the address tag and the content of the memory block is not updated. When the content of the state indicating portion is "updated," a copy of a memory block corresponding to the address tag is held in the cache and the content of the memory block has already been updated.

FIG. 40 illustrates the contents of the state indicating portion updated by directory control unit 803 when directory control unit 803 receives a message. When directory control unit 803 receives "invalidation request," the content of state indicating portion 801a or 801b of the memory block in the cache is referenced, and if the content is "invalid" or "dean," the content of the state indicating portion is updated to "invalid."

When directory control unit 803 receives "update data," the state indicating portion of a directory entry corresponding to the memory block is referenced, and if the content of the state indicating portion corresponding to the cache is "clean," the content of the state indicating portion is "clean" as it is.

When directory control unit 803 receives "write back request," the state indicating portion in directory entry 800 corresponding to the memory block is referenced, and if the content of the state indicating portion corresponding to the cache is "invalid," the content is "invalid" as it is. If the content of the state indicating portion is "clean" or "updated," the content of the state indicating portion is updated to "clean."

When directory control unit 803 receives "read request," the state indicating portion in directory entry 800 corresponding to the memory block is referenced, and if the content of the state indicating portion corresponding to the cache is "invalid," the content of the state indicating portion is updated to "clean."

When directory control unit 803 receives "write privilege acquisition message," the state indicating portion in directory entry 800 corresponding to the memory block is referenced, and if the content of the state indicating portion corresponding to the cache is "clean," the content of the state indicating portion is updated to "updated."

FIGS. 41 and 42 illustrate the contents of "write privilege acquisition request" and information added thereto. "Write privilege acquisition request" is a message transmitted from cache 2a or 2b to consistency control unit 5" for requesting to change the content of a state indicating portion corresponding to the cache in directory entry 800 corresponding to a memory block in directory unit 8, to "updated." Address information of a memory block to be subjected to the write privilege acquisition process is added to "write privilege acquisition request."

FIGS. 43A and 43B illustrate a relation between the contents of directory entry 800 in directory unit 8 and the contents of a cache entry in the cache. When the directory entry has the contents of ① as shown in FIG. 43A, cache A does not have a corresponding memory block and cache B has the corresponding memory block as shown by ①" but the block is not yet updated. When the directory entry in directory unit 8 has the contents of ② as shown in FIG. 43A, cache A has a corresponding memory block having its contents updated as shown in FIG. 43B. In cache B, the corresponding memory block is present as shown by ②" and the contents thereof are updated. Similarly, the contents of ③–⑤ in FIG. 43A respectively correspond to ③' and ③", ④' and ⑤" shown in FIG. 43B.

FIG. 44 illustrates a relation between the contents of the state indicating portion and messages dispatched from consistency control unit 5". If the content of the state indicating portion is "invalid," there is no message transmitted to the cache. If the content of the state indicating portion is "clean," consistency control unit 5" transmits "invalidation request" or "update data" corresponding to the memory block to the cache. If the content of the state indicating portion is "updated," consistency control unit 5" transmits to the cache "invalidation request" or "update data" corresponding to the memory block after transmitting "write back request."

Figure 45:
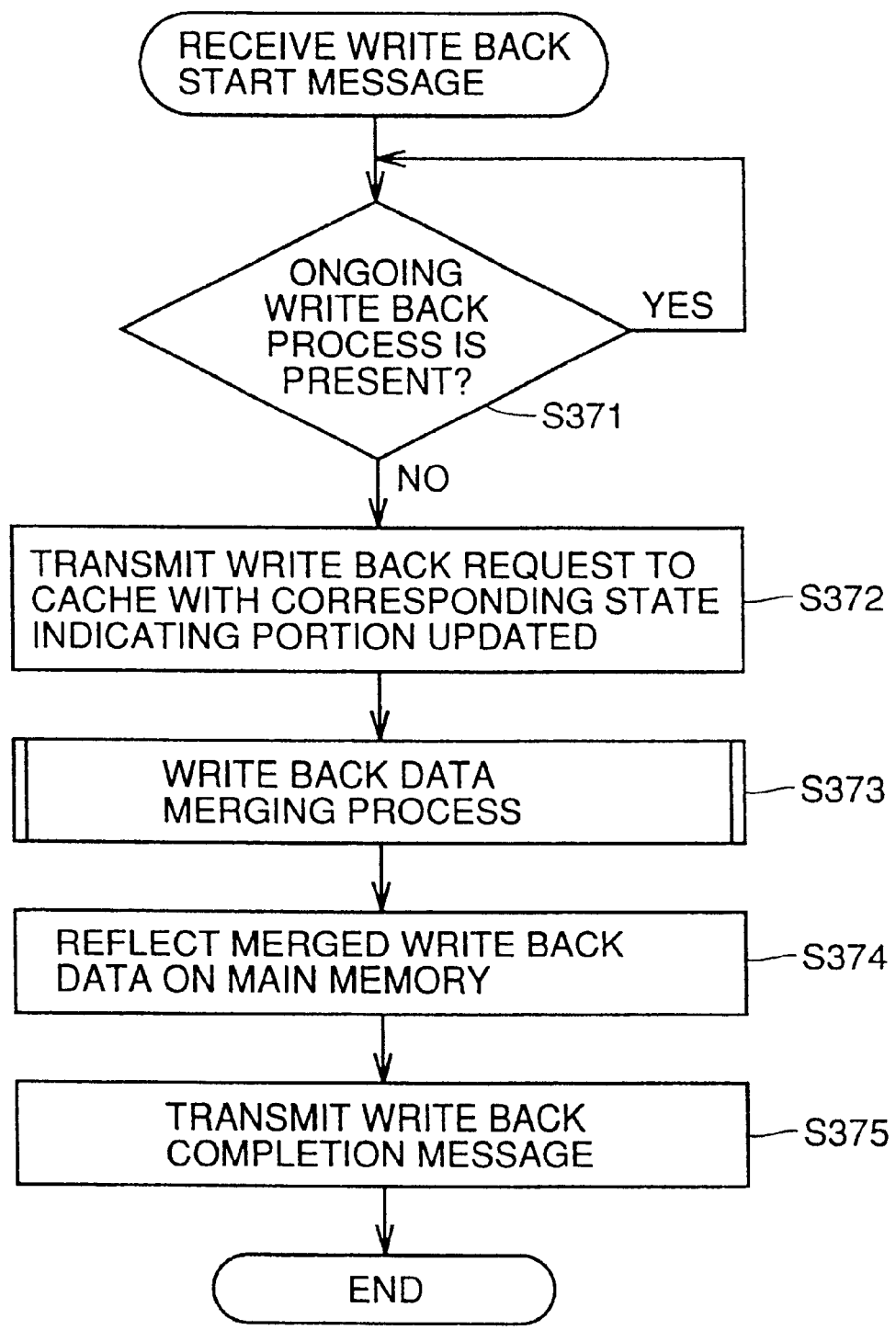
FIG. 45 is a flow chart illustrating a processing procedure of the consistency control unit 5" according to the seventh embodiment of the invention.

FIG. 45 is a flow chart illustrating a processing procedure followed by consistency control unit 5" in this embodiment. When consistency control unit 5" receives "write back start message" from cache 2a or 2b, determination is made as to whether any write back process is in progress or not (S371). If any write back process is ongoing (S371, Yes), the processing is suspended. If there is no ongoing write back process (S371, No), sequencer 501" is started. Sequencer 501" outputs an address to directory unit 8, and the contents (state indicating portion) of a directory entry of a memory block corresponding to this address are read. Sequencer 501" then instructs message transmitting unit 503' to cause a cache corresponding to a state indicating portion having its content "updated" to transmit "write back request." (S372).

When consistency control unit 5" receives write back data, sequencer 501" causes write back data merging unit 504 to carry out the merging process for write back data (S373), and write back data merging unit 504 stores the merged write back data in main memory 3 via main memory bus 640 (S374). Consistency control unit 5" transmits "write back completion message" to the cache that has transmitted "write back start message" (S375), and accordingly the processing is completed.

Figure 46:
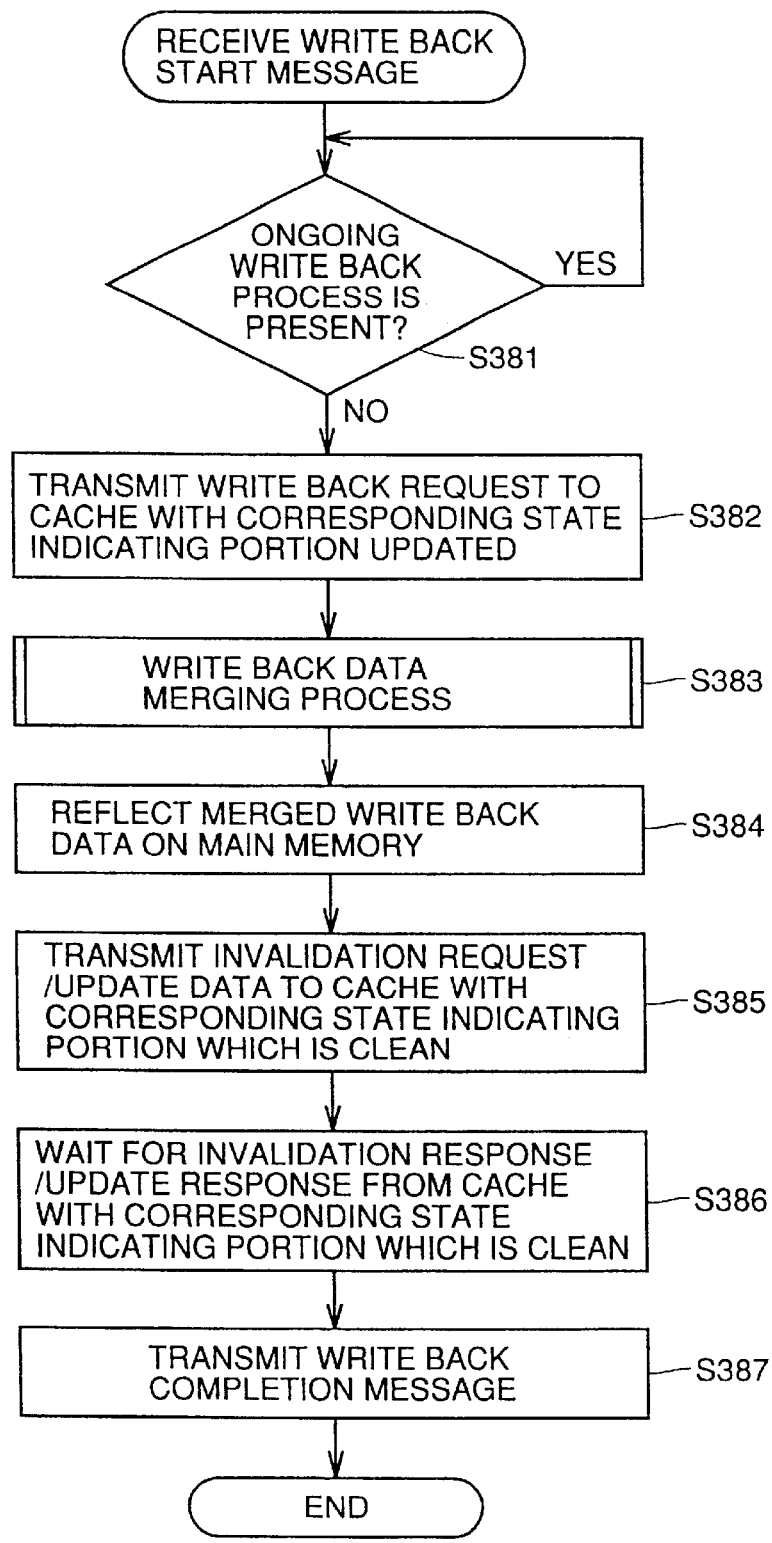
FIG. 46 is a flow chart illustrating another processing procedure of the consistency control unit 5" according to the seventh embodiment of the invention.

FIG. 46 is a flow chart illustrating another process followed when consistency control unit 5" in this embodiment receives "write back start message." When consistency control unit 5" receives "write back start message" from cache 2a or 2b, it is determined whether any write back process is in progress or not (S381). If there is any write back process in progress (S381, Yes), the processing is suspended. If there is no write back process in progress (S381, No), message receiving unit 502' starts sequencer 501". Sequencer 501" outputs an address to directory unit 8, and receives the contents (state indicating portion) of directory entry 800 corresponding to this address via directory unit output bus 680 from directory unit 8.

Sequencer 501" refers to the state indicating portion supplied from directory unit 8, and instructs message transmitting unit 503' to cause a cache corresponding to the state indicating portion having its content "updated" to transmit "write back request" (S382). Sequencer 501" starts write back data merging unit 504 to cause write back data merging unit 504 to merge the received write back data (S383), and the merged write back data is stored in main memory 3 via main memory bus 640 (S384).

Sequencer 501" next refers to the state indicating portion supplied from directory unit 8 to transmit "invalidation request" or "update data" to a cache corresponding to the state indicating portion having its content "clean" (S385). Consistency control unit 5" waits for transmission of "invalidation response" or "update response" from the cache to which "invalidation request" or "update data" was transmitted (S386), transmits "write back complete message" to the cache which supplied "write back start message," when all "invalidation responses" or "update responses" are supplied (S387), and thus this processing is completed.

Concerning the relation between cache 2a or 2b and directory unit 8, there are two control methods. According to one control method, an entry of a memory block stored in cache 2a or 2b is always stored in directory unit 8. According to the other method, an entry of a memory block stored in cache 2a or 2b is not necessarily stored in directory unit 8. A directory unit following the former control method is hereinafter referred to as full directory, and a directory unit following the latter control method is referred to as partial directory. In a multiprocessor device employing the partial directory, if a directory entry cannot be read, consistency control unit 5" transmits "write back request," "invalidation request" or "update data" to all caches. Further, the directory entry should include an LRU field for determining which directory entry is to be discarded when the capacity of the directory is insufficient.

FIG. 47 illustrates a relation between the control method of directory unit 8 and the processing procedure of consistency control unit 5." When directory unit 8 is the full directory, the flow chart shown in FIG. 45 is employed if consistency control unit 5" does not transmit "invalidation request" and "update request." The flow chart shown in FIG. 46 is employed if consistency control unit 5" transmits "invalidation request" or "update request."

When directory unit 8 is the partial directory, if there is a corresponding directory entry in directory unit 8 and consistency control unit 5" does not transmit "invalidation request" and "update request," the flow chart shown in FIG. 45 is employed. If there is a corresponding directory entry in directory unit 8 and consistency control unit 5" transmits "invalidation request" or "update request," consistency control unit 5" follows the flow chart shown in FIG. 46.

When directory unit 8 is the partial directory, if there is no corresponding directory in directory unit 8 and consistency control unit 5" does not transmit "invalidation request" and "update request," consistency control unit 5" employs the flow chart shown in FIG. 11. If there is no corresponding directory in directory unit 8 and consistency control unit 5" transmits "invalidation request" or "update request," consistency control unit 5" employs the flow chart shown in FIG. 20.

In the multiprocessor device according to this embodiment, directory unit 8 is provided to prevent any unnecessary message transmission to a cache having no copy of a memory block and thus the burden of interconnection network 4 can be reduced. Further, the overhead due to retrieval of an address tag which does not exist by a cache having no copy of a memory block, when it receives a message, can be reduced. Still further, if write back data merging unit 504 inconsistency control unit 5" has the circuit structure shown in FIG. 25, the same result as that obtained by counting operation of counting section 522 can be obtained by counting the number of state indicating portions indicating "updated," so that counting unit 522 can be reduced.

(Eighth Embodiment)

Figure 48:
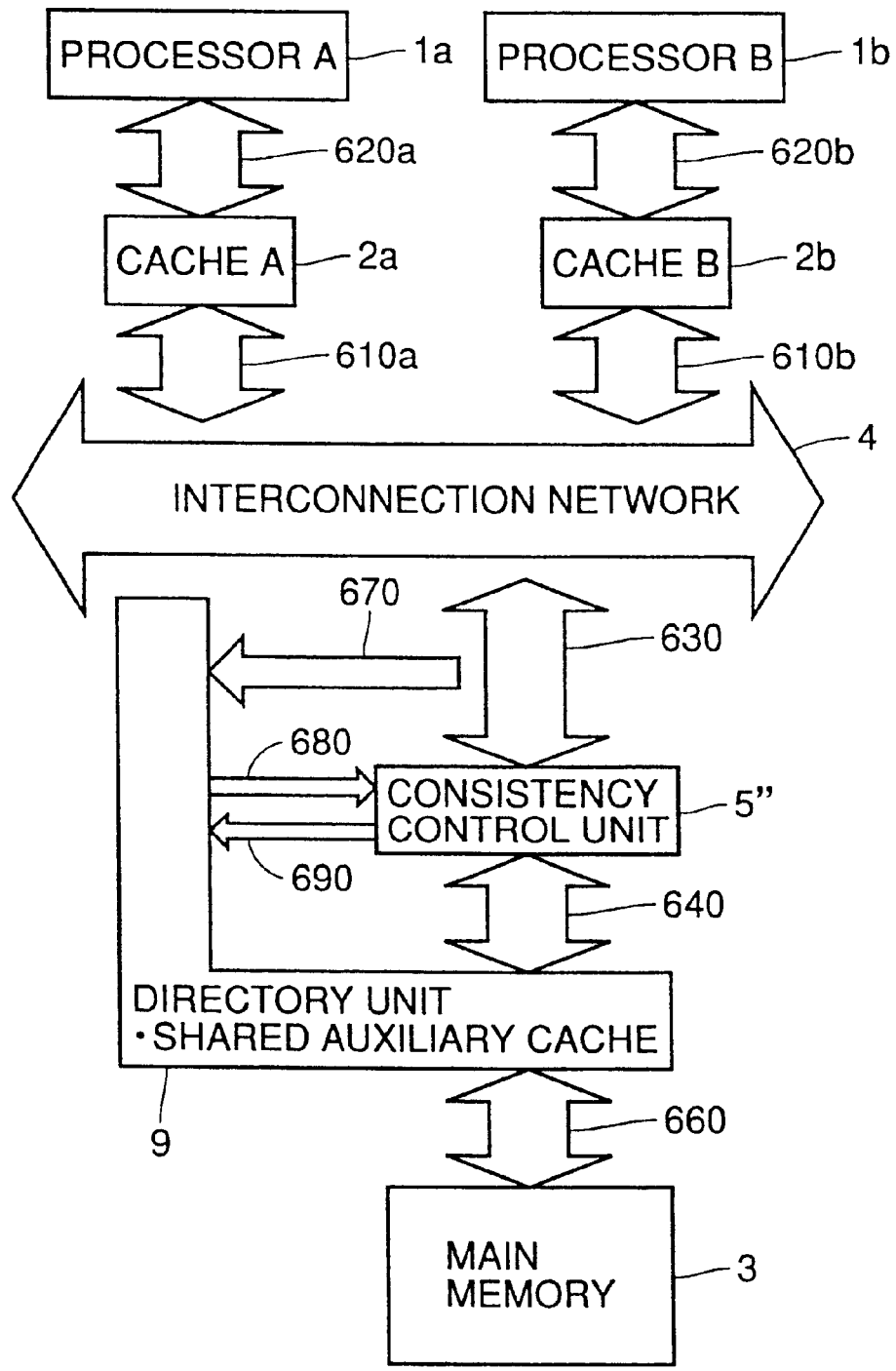
FIG. 48 is a schematic block diagram illustrating a structure of a multiprocessor device according to the eighth embodiment of the invention.

FIG. 48 is a schematic block diagram illustrating a structure of a multiprocessor device according to the eighth embodiment. The multiprocessor device of this embodiment is different from the multiprocessor device according to the seventh embodiment shown in FIG. 36 only in that directory unit 8 is replaced with a directory unit shared auxiliary cache 9, and that directory unit shared auxiliary cache 9 controls the portion between consistency control unit 5" and main memory 3. A detailed description of the same structure and function is not repeated here.

Figure 49:
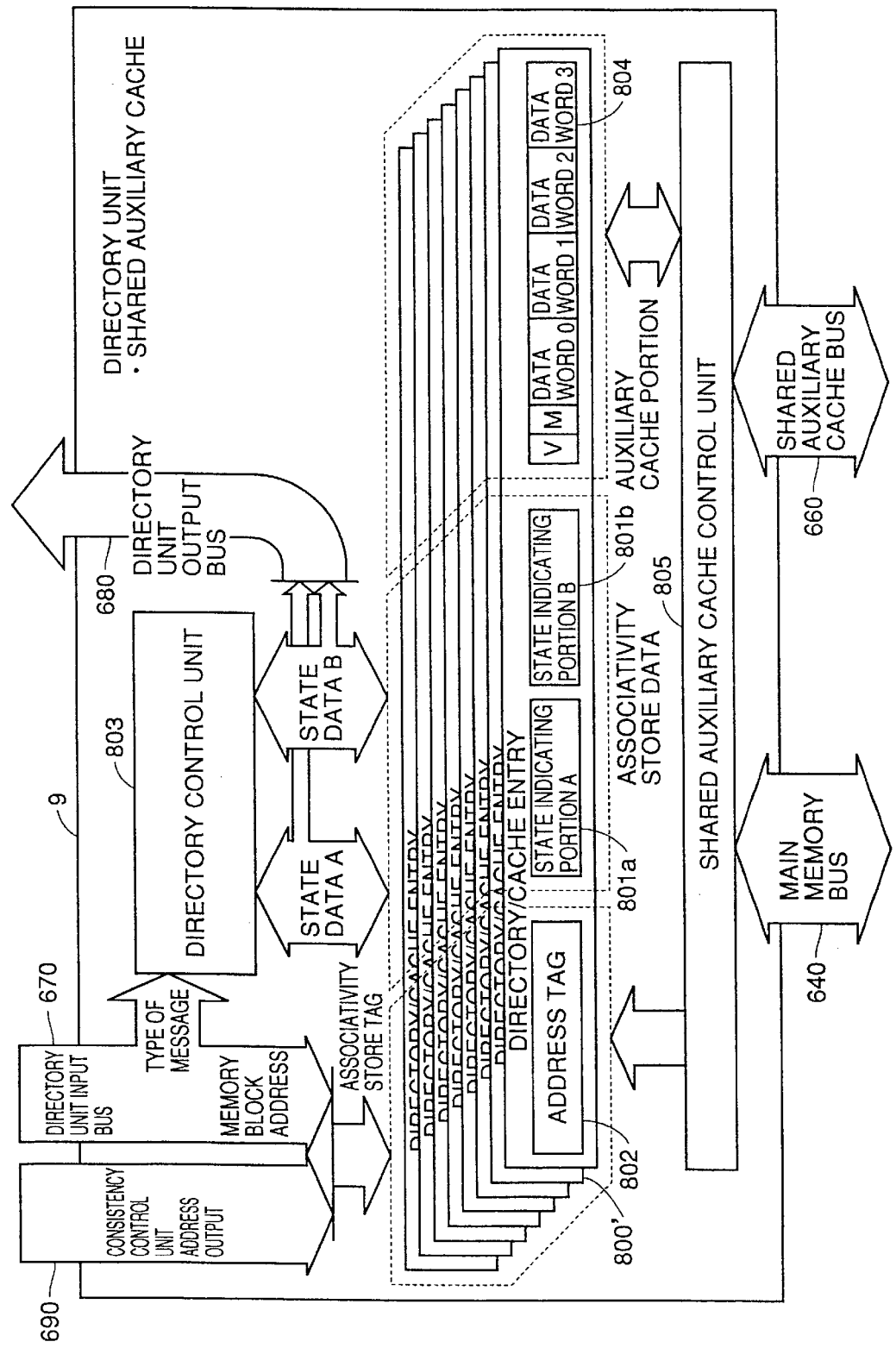
FIG. 49 is a schematic block diagram illustrating a structure of a directory unit shared auxiliary cache 9.

FIG. 49 is a schematic block diagram illustrating a structure of directory unit shared auxiliary cache 9. Directory unit shared auxiliary cache 9 is different from directory unit 8 shown in FIG. 38 only in that directory entry 800 is replaced with a directory/cache entry 800' and that a shared auxiliary cache control unit 805 is added. Therefore, a detailed description of the same structure and function is not repeated here. Directory/cache entry 800' includes an address tag 802, a state indicating portion A, a state indicating portion B, and an auxiliary cache portion 804. If this directory unit is controlled as the partial directory, an LRU field should be added as described above. Address tag 802, state indicating portions A and B are identical to those contained in directory unit 8 shown in FIG. 38. Auxiliary cache portion 804 is formed by removing the address tag and the LRU field from the cache entry shown in FIG. 24.

When consistency control unit 5" makes access to data via main memory bus 640, shared auxiliary cache control unit 805 determines whether cache hit occurs or not by examining the valid bit V in directory/cache entry 800' of a corresponding memory block. If the cache hit occurs, shared auxiliary cache control unit 805 transmits a memory block of auxiliary cache unit 804 to consistency control unit 5". If cache miss occurs, a memory block is read from main memory 3 via a shared auxiliary cache bus 660 and the memory block is transmitted to consistency control unit 5".

In the multiprocessor device of this embodiment, the directory entry and the cache entry of the shared auxiliary cache can be merged to reduce the circuit scale.

(Ninth Embodiment)

A multiprocessor device according to the ninth embodiment has a structure similar to that of the multiprocessor device of the second embodiment. The only difference is the function of cache control unit 22' in the cache shown in FIG. 5. Therefore, a detailed description of the same structure and function is not repeated. A cache control unit of this embodiment will be described using a reference character 22".

The cache of this embodiment detects a special store instruction carried out by processor 1a or 1b. The special store instruction is issued for storing data in the cache and allowing this data to be reflected immediately on main memory 3.

Figure 50:
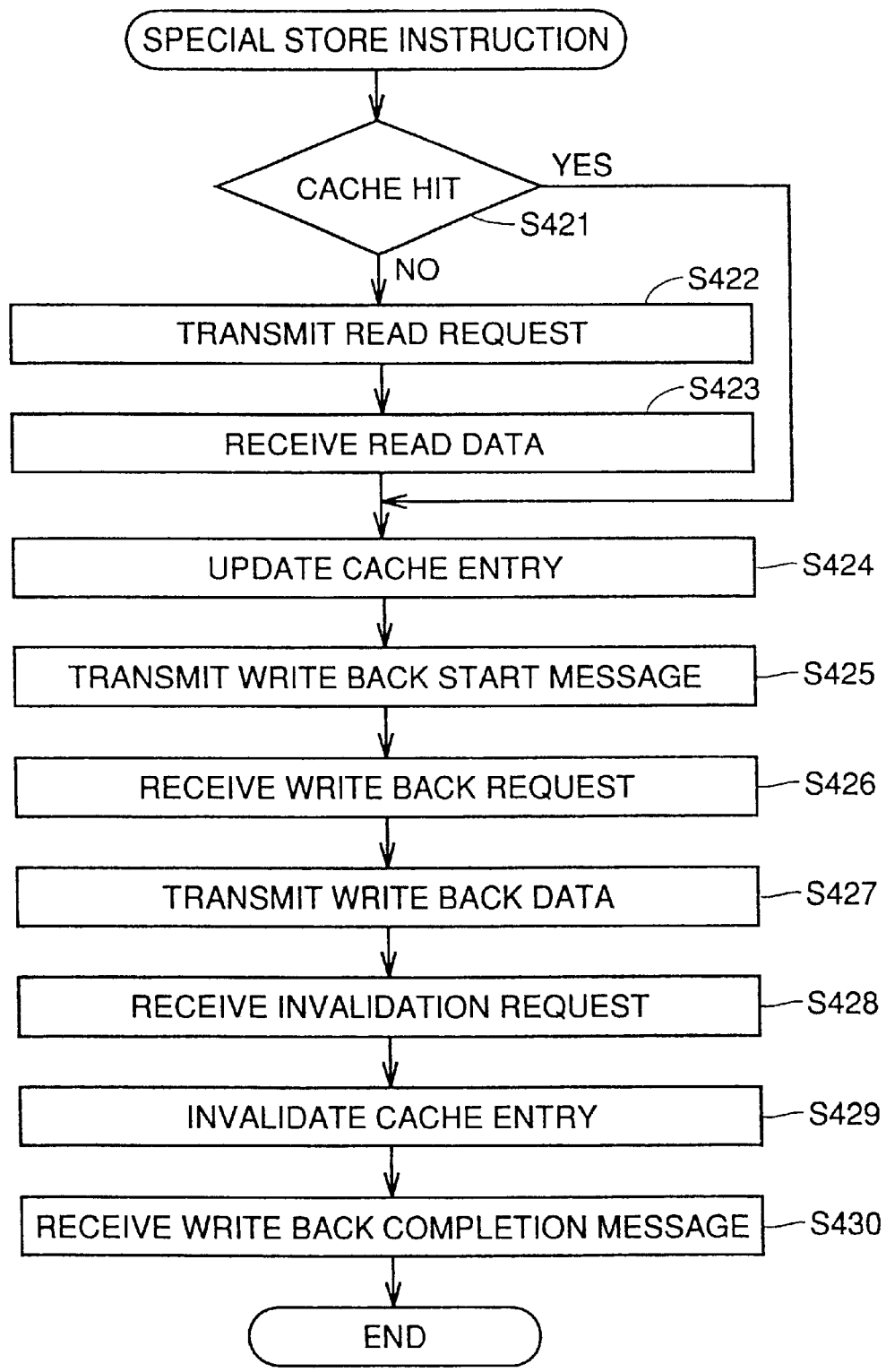
FIG. 50 illustrates a processing procedure of a cache when a processor executes a special store instruction.

FIG. 50 is a flow chart illustrating a processing procedure of the cache in this embodiment. When processor 1a or 1b carries out the special store instruction, the cache detects the special store instruction and determines whether a data word hits the cache (S421). If the data word hits the cache (S421, Yes), step S424 is executed. In the case of cache miss (S421, No), "read request" is transmitted to consistency control unit 5' (S422), and read data is supplied via consistency control unit 5' (S423).

In step S424, cache control unit 22" updates a cache entry of a memory block including the data word in the cache set group 24 (S424), and transmits "write back start message" to consistency control unit 5' via interconnection network interface 23 (S425). When "write back request" is supplied from consistency control unit 5' (S426), "write back data" is supplied to consistency control unit 5' (S427). "Invalidation request" is supplied from consistency control unit 5' (S428), the cache entry is invalidated (S429), "write back completion message" is supplied from consistency control unit 5' (S430), and accordingly, the processing is completed.

In the multiprocessor device of this embodiment as described above, when the processor carries out the special store instruction, the cache transmits "write back start message" to consistency control unit 5' so that the data word written to the cache by the processor is immediately reflected on main memory 3 and accordingly, all the other processors can refer to the contents of the memory block.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A consistency control device comprising:
   a data merging unit selecting updated portion of write-back data in a memory block in response to detection of said updated portion of write-back data, extracting one or more data words of said selected updated portion of the write-back data in said memory block and one or more distinguished data words of said selected updated portion of the write-back data in said memory block, said write-back received from a cache, and merging the selected updated portions of the write-back data;
   a storing unit for storing the memory block merged by said data merging unit in a main memory; and
   a sequencer unit operatively connected to said data merging unit to control said consistency control device.

2. The consistency control device according to claim 1, further comprising a detecting unit detecting that all updated memory blocks have arrived from the external unit.

3. The consistency control device according to claim 1, further comprising a communication unit receiving a write back start message of a memory block from the external unit and transmitting a write back request to the external unit.

4. The consistency control device according to claim 1, further comprising an invalidation requesting unit for requesting to the external unit invalidation of a copy of the memory block received by said data merging unit.

5. The consistency control device according to claim 1, further comprising an update requesting unit for requesting to the external unit update of the memory block received by said data merging unit.

6. The consistency control device of claim 1, further comprising a message receiving unit which starts the sequencer unit upon receipt of a write-back start message from the external unit.

7. The consistency control device of claim 1, wherein the sequencer unit is operatively connected to a directory control unit, said directory control unit receiving a memory block address from the sequencer unit and providing a state of the memory block located at the memory block address to the sequencer unit.

8. A consistency control device, comprising:
   a sequencer unit for receiving first write-back data from a first cache and second write-back data from a second cache in response to a write-back request from the consistency control device, each of said first and second write-back data including associated identification information indicating one or more updated data words of a plurality of data words in the first and second write-back data;

a data merging unit operatively connected to said sequencer unit for merging said one or more updated data words of said first and second write-back data into a merged memory block based on the first and second write-back data and the associated identification information; and a storing unit for storing the merged memory block in a main memory.

9. The consistency control device of claim 8, wherein the identification information includes a validity bit and a plurality of modified bits that specify which of the plurality of data words have been updated, wherein the plurality of data words are either clean or updated when said validity bit is in a set condition.

10. The consistency control device of claim 8, wherein the storing unit stores the merged memory block in the main memory through a shared auxiliary cache.

11. A consistency control device, comprising:

a message receiving unit for receiving first write-back data from a first cache and second write-back data from a second cache in response to a write-back request from the consistency control device to the first and second cache, each of said first and second write-back data including associated identification information indicating one or more updated data words of a plurality of data words in the first and second write-back data;

a data merging unit operatively connected to said message receiving unit for merging said one or more updated data words of said first and second write-back data into a merged memory block based on the first and second write-back data and the associated identification information; and a storing unit for storing the merged memory block in a main memory.

12. The consistency control device of claim 11, wherein the storing unit stores the merged memory block in the main memory through a shared auxiliary cache.

13. A consistency control device comprising:

a data merging unit extracting one or more data words of updated write-back data from a first cache and extracting one or more distinguished data words of said updated write-back data from a second cache, said updated write-back data being of a cache entry of a same memory block and merging the updated write-back data; and a storing unit for storing the merged updated write back data by said data merging unit in a main memory; and a sequencer unit operatively connected to said data merging unit to control said consistency control device.

* * * * *